US011329374B2

(12) United States Patent
Li

(10) Patent No.: US 11,329,374 B2
(45) Date of Patent: May 10, 2022

(54) ANTENNA DEVICE, ELECTRONIC APPARATUS AND METHOD FOR ANTENNA SWITCHING

(71) Applicant: GUANGDONG OPPO MOBILE TELECOMMUNICATIONS CORP., LTD., Guangdong (CN)

(72) Inventor: Si Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 211 days.

(21) Appl. No.: 16/911,035

(22) Filed: Jun. 24, 2020

(65) Prior Publication Data
US 2021/0066797 A1  Mar. 4, 2021

(30) Foreign Application Priority Data
Aug. 30, 2019 (CN) .......................... 201910819119.4

(51) Int. Cl.
*H01Q 1/36* (2006.01)
*H01Q 3/24* (2006.01)
(Continued)

(52) U.S. Cl.
CPC ........... *H01Q 3/247* (2013.01); *H01Q 1/2216* (2013.01); *H01Q 1/48* (2013.01); *H01Q 5/371* (2015.01);
(Continued)

(58) Field of Classification Search
CPC ........ H01Q 3/247; H01Q 1/2216; H01Q 1/48; H01Q 5/371; H01Q 7/00; H01Q 1/243;
(Continued)

(56) References Cited

U.S. PATENT DOCUMENTS 10,193,597 B1 *  1/2019  Garrido Lopez ........ H04B 1/38
10,200,092 B1 *  2/2019  Irci ...................... H04B 7/0413
(Continued)

FOREIGN PATENT DOCUMENTS

CN   104638344 A    5/2015
CN   104700145 A    6/2015
(Continued)

OTHER PUBLICATIONS

Chinese Notice of Allowance with English Translation for CN Application 201910819119.4 dated Jan. 18, 2022. (8 pages).
(Continued)

*Primary Examiner* — Dimary S Lopez Cruz
*Assistant Examiner* — Bamidele A Jegede
(74) *Attorney, Agent, or Firm* — Young Basile Hanlon & MacFarlane, P.C.

(57) ABSTRACT

An antenna device, an electronic apparatus and a method for antenna switching are disclosed by embodiments of the present disclosure. The antenna device includes: a near field communication chip configured to provide a differential excitation current; a ground plane forming a conductive path thereon; a plurality of first conductive assemblies; a first switch configured to selectively be in communication one or more of the first conductive assemblies; a second conductive assembly. The communicating first conductive assembly, the conductive path, and the second conductive assembly together constitute a conductive loop for transmission of the differential excitation current.

20 Claims, 9 Drawing Sheets

(51) Int. Cl.
  *H01Q 5/371*  (2015.01)
  *H01Q 1/22*   (2006.01)
  *H01Q 1/48*   (2006.01)
  *H01Q 7/00*   (2006.01)
  H01Q 1/24    (2006.01)
  H04B 5/00    (2006.01)

(52) U.S. Cl.
  CPC ............... *H01Q 7/00* (2013.01); *H01Q 1/243* (2013.01); *H04B 5/0081* (2013.01)

(58) Field of Classification Search
  CPC .......... H01Q 1/36; H01Q 1/22; H01Q 1/2258; H01Q 1/242; H01Q 1/38; H01Q 1/44; H01Q 1/50; H01Q 23/00; H04B 5/0081; H04B 7/0602; H04B 5/0031; H04B 5/0025
  See application file for complete search history.

(56) References Cited

U.S. PATENT DOCUMENTS

| | | | |
|---|---|---|---|
| 2008/0231526 A1 | 9/2008 | Sato | |
| 2013/0189923 A1* | 7/2013 | Lewin | H04B 5/02 455/41.1 |
| 2013/0241796 A1* | 9/2013 | Nagumo | H04B 1/0458 343/861 |
| 2014/0148095 A1* | 5/2014 | Smith | H04B 5/02 455/41.1 |
| 2014/0320353 A1* | 10/2014 | Lin | H01Q 1/38 343/893 |
| 2015/0038079 A1* | 2/2015 | Kwon | H04B 5/0081 455/566 |
| 2015/0249292 A1* | 9/2015 | Ouyang | H01Q 21/30 343/702 |
| 2015/0303568 A1* | 10/2015 | Yarga | H01Q 5/321 343/722 |
| 2016/0197651 A1* | 7/2016 | Tsukamoto | H04W 4/026 455/41.1 |
| 2016/0241319 A1* | 8/2016 | Kim | H04B 7/0834 |
| 2016/0365623 A1* | 12/2016 | Kim | H01Q 9/42 |
| 2017/0033440 A1* | 2/2017 | Kim | H01Q 1/243 |
| 2017/0048649 A1* | 2/2017 | Olgun | H01Q 1/243 |
| 2017/0338541 A1* | 11/2017 | Tsai | H01Q 7/00 |
| 2018/0351589 A1* | 12/2018 | Shin | H01Q 9/42 |
| 2019/0027833 A1* | 1/2019 | Ayala Vazquez | H01Q 1/243 |

FOREIGN PATENT DOCUMENTS

| | | |
|---|---|---|
| CN | 105870588 A | 8/2016 |
| CN | 105940550 A | 9/2016 |
| CN | 206402224 U | 8/2017 |
| CN | 107403995 A | 11/2017 |
| CN | 107623170 A | 1/2018 |
| CN | 108288754 A | 7/2018 |
| CN | 108512957 A | 9/2018 |
| CN | 109660642 A | 4/2019 |
| CN | 110176670 A | 8/2019 |
| EP | 3131209 A1 | 2/2017 |
| JP | 2008288917 A | 11/2008 |

OTHER PUBLICATIONS

Indian Examination Report for IN Application 202014029171 dated Nov. 10, 2021. (6 pages).
Chinese First Office Action with English Translation for CN Application 201910819119.4 dated Jun. 29, 2021. (18 pages).
Extended European Search Report for EP application 20184884.3 dated Dec. 7, 2020.
ISR for PCT application PCTCN2020101245 dated Oct. 12, 2020.

* cited by examiner

ANTENNA DEVICE, ELECTRONIC APPARATUS AND METHOD FOR ANTENNA SWITCHING

CROSS-REFERENCE TO RELATED APPLICATION(S)

This application claims priority to and benefits of Chinese Patent Application Serial No. 201910819119.4, filed on Aug. 30, 2019, the entire content of which is incorporated herein by reference.

TECHNICAL FIELD

The present application relates to a field of communication technology, and more particularly, to an antenna device, an electronic apparatus, and a method for antenna switching.

BACKGROUND

With the development of communication technology, electronic apparatuses such as smart phones can implement more and more functions, and communication modes of electronic apparatuses have become more diverse. For example, common electronic apparatuses can support multiple communication modes such as cellular network communication, wireless fidelity (Wi-Fi) communication, global positioning system (GPS) communication, and Bluetooth (BT) communication. In addition, with the advancement of communication technology, near field communication (NFC) has recently made its way into electronic apparatuses.

In many electronic apparatuses, when the NFC is performed between an electronic apparatus and another electronic apparatus, for example, when a user uses the electronic apparatus to perform NFC card-swiping, a card-swiping area on the electronic apparatus is fixed, thereby limiting the NFC function of the electronic apparatus.

SUMMARY

Embodiments of the present disclosure provide an antenna device, an electronic apparatus, and a method for antenna switching.

Embodiments of the present disclosure provide an antenna device. The antenna device includes: a near field communication chip including a first differential signal port and a second differential signal port both configured to provide a differential excitation current; a ground plane including a first ground point and a second ground point spaced apart from each other, and forming a conductive path between the first ground point and the second ground point; a plurality of first conductive assemblies, each of the first conductive assemblies including a first feed port and a first ground port spaced apart from each other, the first ground port being electrically coupled to the first ground point; a first switch including a first pole port coupled to the first differential signal port and a first throw port coupled to the first feed port of each of the first conductive assemblies, and configured to selectively allow the first differential signal port to be in communication with one or more first conductive assemblies from the first conductive assemblies; and a second conductive assembly including a second feed port and a second ground port spaced apart from each other, the second feed port being electrically coupled to the second differential signal port, and the second ground port being electrically coupled to the second ground point. The first conductive assembly communicating with the first differential signal port, the conductive path, and the second conductive assembly together constitute a conductive loop for transmission of the differential excitation current.

Embodiments of the present disclosure further provide an electronic apparatus. The electronic apparatus includes: a circuit board and an antenna device. The antenna device includes: a near field communication chip arranged on the circuit board, and providing a differential excitation current through a first differential signal port and a second differential signal port; a ground plane arranged on the circuit board, including a first ground point and a second ground point spaced apart from each other, and forming a conductive path between the first ground point and the second ground point; a plurality of first conductive assemblies, each of the first conductive assemblies including a first feed port and a first ground port spaced apart from each other, the first ground port being electrically coupled to the first ground point; at least one switch including a first pole port coupled to the first differential signal port and a first throw port coupled to the first feed port of each of the first conductive assemblies, and configured to selectively allow the first differential signal port to be in communication with one or more first conductive assemblies from the first conductive assemblies; and a second conductive assembly including a second feed port and a second ground port spaced apart from each other, the second feed port being electrically coupled to the second differential signal port, and the second ground port being electrically coupled to the second ground point. When the at least one switch allows the first differential signal port to be in communication with the first conductive assembly, the first conductive assembly, the conductive path, and the second conductive assembly jointly generate an alternating electromagnetic field to radiate an NFC signal.

Embodiments of the present disclosure further provide a method for antenna switching that is applied to the above antenna device. The method includes: detecting a distance between each of the plurality of first conductive assemblies and an external object; determining a target first conductive assembly from the plurality of first conductive assemblies according to distances, the target first conductive assembly being a conductive assembly from the plurality of first conductive assemblies having the smallest distance from the external object; and controlling the first switch to allow the first differential signal port to be in communication with the target first conductive assembly.

BRIEF DESCRIPTION OF DRAWINGS

In order to explain the technical solutions in embodiments of the present disclosure more clearly, drawings used in the description of the embodiments will be briefly introduced below. Obviously, the drawings described below only illustrate some embodiments of the present disclosure. For those skilled in the art, other drawings can be obtained without paying creative efforts based on these drawings.

DETAILED DESCRIPTION

Figure 1:
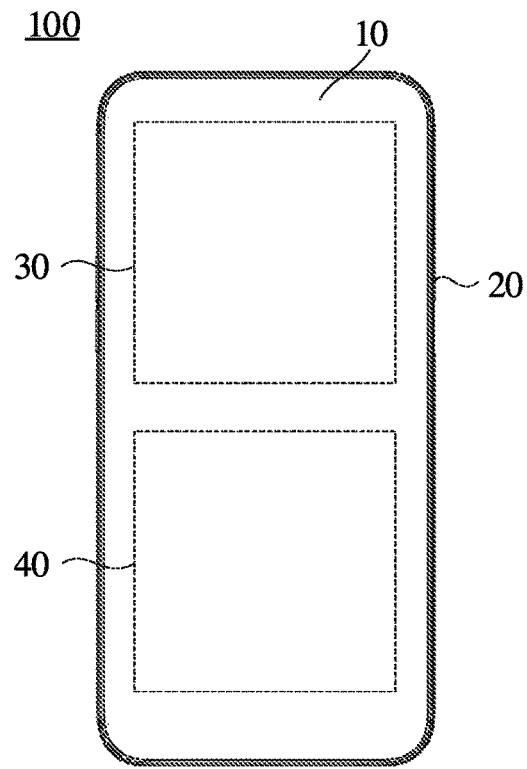
FIG. 1 illustrates a structural schematic view of an electronic apparatus according to an embodiment of the present disclosure.

Technical solutions in the embodiments of the present disclosure will be clearly and completely described below with reference to the drawings in the embodiments of the present disclosure. Obviously, the described embodiments are merely part of the embodiments of the present disclosure, rather than all the embodiments. Based on the embodiments in the present disclosure, all other embodiments obtained by those skilled in the art without paying creative effort will fall into the protection scope of the present disclosure.

The present disclosure relates to an antenna device. The antenna device can include: a near field communication chip including a first differential signal port and a second differential signal port both configured to provide a differential excitation current; a ground plane including a first ground point and a second ground point spaced apart from each other, and forming a conductive path between the first ground point and the second ground point; a plurality of first conductive assemblies, each of the first conductive assemblies including a first feed port and a first ground port spaced apart from each other, the first ground port being electrically coupled to the first ground point; a first switch including a first pole port coupled to the first differential signal port and a first throw port coupled to the first feed port of each of the first conductive assemblies, and configured to selectively allow the first differential signal port to be in communication with one or more first conductive assemblies from the first conductive assemblies; and a second conductive assembly including a second feed port and a second ground port spaced apart from each other, the second feed port being electrically coupled to the second differential signal port, and the second ground port being electrically coupled to the second ground point. The first conductive assembly communicating with the first differential signal port, the conductive path, and the second conductive assembly together constitute a conductive loop for transmission of the differential excitation current.

The present disclosure also relates to an electronic apparatus. The electronic apparatus can include: a circuit board and an antenna device. The antenna device includes: a near field communication chip arranged on the circuit board, and providing a differential excitation current through a first differential signal port and a second differential signal port; a ground plane arranged on the circuit board, including a first ground point and a second ground point spaced apart from each other, and forming a conductive path between the first ground point and the second ground point; a plurality of first conductive assemblies, each of the first conductive assemblies including a first feed port and a first ground port spaced apart from each other, the first ground port being electrically coupled to the first ground point; at least one switch including a first pole port coupled to the first differential signal port and a first throw port coupled to the first feed port of each of the first conductive assemblies, and configured to selectively allow the first differential signal port to be in communication with one or more first conductive assemblies from the first conductive assemblies; and a second conductive assembly including a second feed port and a second ground port spaced apart from each other, the second feed port being electrically coupled to the second differential signal port, and the second ground port being electrically coupled to the second ground point. When the at least one switch allows the first differential signal port to be in communication with the first conductive assembly, the first conductive assembly, the conductive path, and the second conductive assembly jointly generate an alternating electromagnetic field to radiate an NFC signal.

The present disclosure further relates to a method for antenna switching that is applied to the above antenna device. The method can include: detecting a distance between each of the plurality of first conductive assemblies and an external object; determining a target first conductive assembly from the plurality of first conductive assemblies according to distances, the target first conductive assembly being a conductive assembly from the plurality of first conductive assemblies having the smallest distance from the external object; and controlling the first switch to allow the first differential signal port to be in communication with the target first conductive assembly.

Embodiments of the present disclosure provide an electronic apparatus. The electronic apparatus may be a smartphone, a tablet computer, a game device, an augmented reality (AR) device, an automobile device, a data storage device, an audio player, a video player, a notebook computer, a desktop computer, and so on.

FIG. 1 illustrates a structural schematic view of an electronic apparatus 100 according to an embodiment of the present disclosure.

The electronic apparatus 100 includes a display screen 10, a casing 20, a circuit board 30, and a battery 40.

The display screen 10 is arranged on the casing 20 to form a display surface of the electronic apparatus 100 for displaying information, such as images and text. The display screen 10 may include a liquid crystal display (LCD) or an organic light-emitting diode display (OLED).

It could be understood that the display screen 10 may include a display surface and a non-display surface opposite to the display surface. The display surface is a surface of the display screen 10 facing a user, that is, a surface of the display screen 10 that is visible to the user on the electronic apparatus 100. The non-display surface is a surface of the display screen 10 facing an interior of the electronic apparatus 100. The display surface is configured to display information, and the non-display surface does not display information.

It could be understood that a cover plate can also be provided on the display screen 10 to protect the display screen 10 and prevent the display screen 10 from being scratched or damaged by water. The cover plate may be a transparent glass cover plate, such that the user can observe the content displayed on the display screen 10 through the cover plate. It could be understood that the cover plate may be a glass cover plate made of sapphire.

The casing 20 is configured to form an external contour of the electronic apparatus 100, so as to accommodate electronic components, functional modules, and the like of the electronic apparatus 100, and at the same time seal and protect the electronic components and functional modules inside the electronic apparatus. For example, functional modules such as a camera, a circuit board, and a vibration motor of the electronic apparatus 100 can be arranged inside the casing 20. It could be understood that the casing 20 may include a middle frame and a battery cover.

The middle frame may be in a structure of a thin plate or a sheet, or may be of a hollow frame. The middle frame is configured to provide support for the electronic components or functional modules in the electronic apparatus 100, so as to mount the electronic components and functional modules of the electronic apparatus 100 together. For example, the middle frame may be provided with structures such as a groove, a protrusion, or a through hole, so as to facilitate the mounting of the electronic components or the functional modules of the electronic apparatus 100. It could be understood that the material of the middle frame may include metals or plastics.

The battery cover is connected to the middle frame. For example, the battery cover may be attached to the middle frame through an adhesive such as a double-sided tape, thereby achieving connection with the middle frame. The battery cover is configured to seal the electronic components and functional modules of the electronic apparatus 100 inside the electronic apparatus 100 together with the middle frame and the display screen 10, so as to protect the electronic components and functional modules of the electronic apparatus 100. It could be understood that the battery cover can be integrally formed. During the formation of the battery cover, the battery cover may be formed with a structure, such as a mounting hole for a rear camera. It could be understood that the material of the battery cover may also include metals or plastics.

The circuit board 30 is arranged inside the casing 20. For example, the circuit board 30 may be mounted to the middle frame of the casing 20 to be fixed, and the circuit board 30 is sealed inside the electronic apparatus by the battery cover. The circuit board 30 may be a main board of the electronic apparatus 100. The circuit board 30 may further integrate one or more of functional modules, such as a processor, a camera, a headphone interface, an acceleration sensor, a gyroscope, and a motor. Meanwhile, the display screen 10 may be electrically coupled to the circuit board 30, and the display of the display screen 10 is controlled by the processor on the circuit board 30.

The battery 40 is arranged inside the casing 20. For example, the battery 40 can be mounted to the middle frame of the casing 20 to be fixed, and the battery 40 is sealed inside the electronic apparatus by the battery cover. At the same time, the battery 40 is electrically coupled to the circuit board 30, such that the battery 40 provides power for the electronic apparatus 100. The circuit board 30 can be provided with a power management circuit. The power management circuit is configured to distribute voltage provided by the battery 40 to each electronic component in the electronic apparatus 100.

The electronic apparatus 100 is further provided with an antenna device 200. The antenna device 200 is configured to implement a wireless communication function of the electronic apparatus 100. For example, the antenna device 200 can be configured to implement near field communication (NFC). The antenna device 200 is arranged inside the casing 20 of the electronic apparatus 100. It could be understood that some components of the antenna device 200 can be integrated on the circuit board 30 inside the casing 20. For example, a signal processing chip and a signal processing circuit in the antenna device 200 can be integrated on the circuit board 30. In addition, some components of the antenna device 200 can be directly arranged inside the casing 20. For example, a radiator for radiating signals or a conductive assembly of the antenna device 200 can be directly arranged inside the casing 20.

Figure 2:
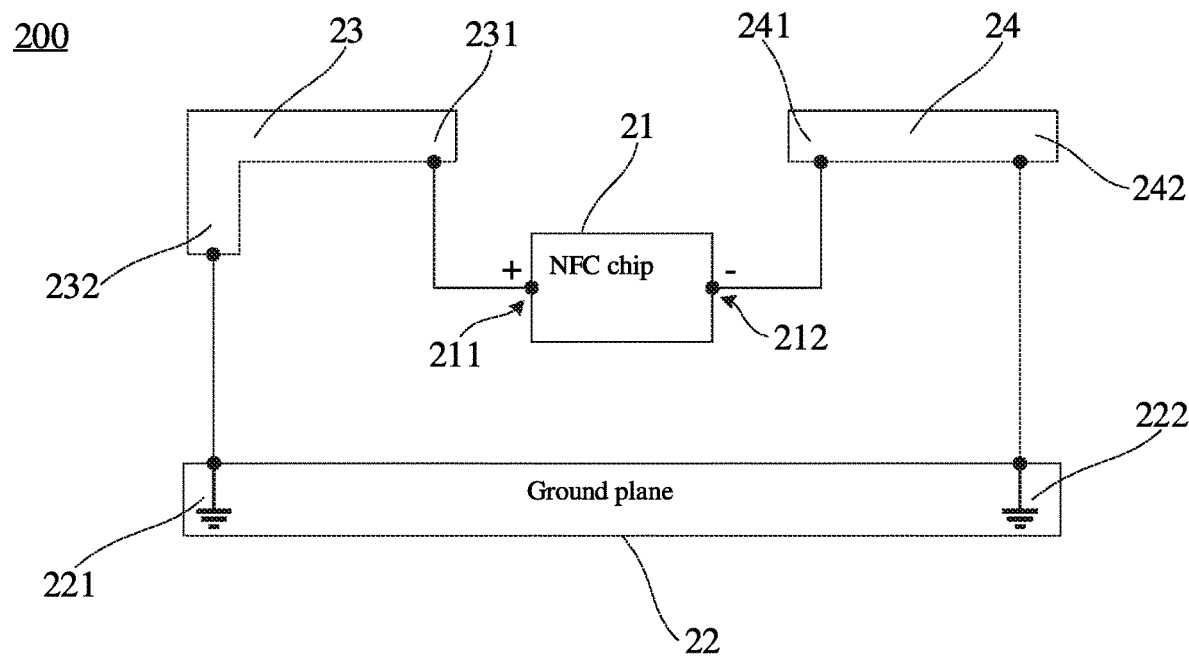
FIG. 2 illustrates a structural schematic view of a first embodiment of an antenna device according to the present disclosure.

FIG. 2 illustrates a structural schematic view of a first embodiment of the antenna device 200 according to the present disclosure. The antenna device 200 includes a near field communication chip 21, a ground plane 22, a first conductive assembly 23, and a second conductive assembly 24.

In the description of the present disclosure, it should be understood that terms such as "first" and "second" are only used to distinguish similar objects and cannot be constructed as indicating or implying relative importance or implicitly indicating the number of technical features.

The near field communication (NFC) chip 21 can be configured to provide a differential excitation current. The differential excitation current includes two current signals. The two current signals have same amplitude and opposite phases, which can be understood in such a way that the two current signals have a phase difference of 180 degrees. In addition, the differential excitation current is a balanced signal. It could be understood that, during transmission of an analog signal, if the analog signal is directly transmitted, it is an unbalanced signal; if the original analog signal is inverted, and then the inverted analog signal and the original analog signal are transmitted simultaneously, the inverted analog signal and the original analog signal are called balanced signals. The balanced signal passes through a differential amplifier during the transmission. The inverted analog signal is subtracted from the original analog signal to obtain an enhanced original analog signal. During the transmission, two transmission lines are subject to same interference, and in the process of subtraction, the same interference signal is subtracted, so the anti-interference performance of the balanced signal is better.

The NFC chip 21 includes a first differential signal port 211 and a second differential signal port 212. For example, the first differential signal port 211 may be a positive (+) port of the NFC chip 21, and the second differential signal port 212 may be a negative (−) port of the NFC chip 21. Alternatively, the first differential signal port 211 may be a negative port of the NFC chip 21, and the second differential signal port 212 may be a positive port of the NFC chip 21. The first differential signal port 211 and the second differential signal port 212 are configured to provide the differential excitation current. For example, the differential excitation current provided by the NFC chip 21 may be output to the antenna device 200 via the first differential signal port 211 and return to the NFC chip 21 via the second differential signal port 212, thereby forming a current loop.

It could be understood that the NFC chip 21 may be provided on the circuit board 30 of the electronic apparatus 100; or a separate small circuit board may be provided in the electronic apparatus 100, and the NFC chip 21 is integrated on the separate circuit board. The separate circuit board may be for example a small board in the electronic apparatus 100.

The ground plane 22 is configured to form a common ground. The ground plane 22 can be formed by a conductor, a printed circuit, or a metal printed layer in the electronic apparatus 100. For example, the ground plane 22 may be arranged on the circuit board 30 of the electronic apparatus 100. The ground plane 22 may also be formed on the casing 20 of the electronic apparatus 100. For example, the ground plane 22 may be formed by the middle frame of the casing 20, or may be formed by the battery cover of the casing 20.

The ground plane 22 includes a first ground point 221 and a second ground point 222 spaced apart from each other. For example, the first ground point 221 and the second ground point 222 may be ends of the ground plane 22, or may be raised structures on the ground plane 22, or may be welding pads formed on the ground plane 22, or a region of a certain area on the ground plane 22.

The ground plane 22 forms a conductive path between the first ground point 221 and the second ground point 222, and the conductive path can be configured to conduct current. That is, when a voltage signal is applied at the first ground point 221 and the second ground point 222, a current can be generated between the first ground point 221 and the second ground point 222, thereby forming a current loop. It could be understood that when the NFC chip 21 provides a differential excitation current, the conductive path between the first ground point 221 and the second ground point 222 can be configured to transmit the differential excitation current.

The first conductive assembly 23 includes a first feed port 231 and a first ground port 232 spaced apart from each other. The first feed port 231 is electrically coupled to the first differential signal port 211 of the NFC chip 21, such that the first differential signal port 211 feeds power to the first feed port 231. For example, the differential excitation current provided by the NFC chip 21 can be transmitted to the first feed port 231 via the first differential signal port 211, so as to feed power to the first conductive assembly 23. The first ground port 232 is electrically coupled to the first ground point 221 of the ground plane 22, so as to achieve the ground return of the first conductive assembly 23.

The second conductive assembly 24 includes a second feed port 241 and a second ground port 242 spaced apart from each other. The second feed port 241 is electrically coupled to the second differential signal port 212 of the NFC chip 21, such that the second differential signal port 212 feeds power to the second feed port 241. For example, the differential excitation current provided by the NFC chip 21 can be transmitted to the second differential signal port 212 via the second feed port 241, so as to feed power to the second conductive assembly 24. The second ground port 242 is electrically coupled to the second ground point 222 of the ground plane 22, so as to realize the ground return of the second conductive assembly 24.

The first conductive assembly 23 and the second conductive assembly 24 may both be metal structures or metal traces on the circuit board 30 in the electronic apparatus 100. It should be noted that the second conductive assembly 24 and the first conductive assembly 23 are of different conductive assemblies.

For example, the circuit board 30 of the electronic apparatus 100 is provided with a printed circuit. The first conductive assembly 23 may be the printed circuit, or the second conductive assembly 24 may be the printed circuit.

For another example, the electronic apparatus 100 includes a flexible printed circuit (FPC), and the FPC is electrically coupled to the circuit board 30. For example, the FPC may be a structure, such as a display FPC, a camera FPC, a motor FPC, or the like; or the FPC may be an independent FPC configured to implement an NFC conductive assembly, and can be fixed in the casing of the electronic apparatus. The FPC is provided with metal traces configured to transmit signals, for example, control signals for the display screen, control signals for the camera, control signals for the motor, and the like. The first conductive assembly 23 can include the metal traces, or the second conductive assembly 24 includes the metal traces.

For yet another example, the casing 20 of the electronic apparatus 100 includes a middle frame, and the circuit board 30 may be arranged on the middle frame. The middle frame includes a first metal branch and a second metal branch spaced apart from each other. For example, a plurality of slits may be provided in the middle frame, and the first metal branch and the second metal branch are formed by the plurality of slits. One of the first conducive assemblies 23 includes the first metal branch, and the second conductive assembly 24 includes the second metal branch.

For still another example, the electronic apparatus 100 may include a front camera and a rear camera. Each of the front camera and the rear camera may be provided with a decorative ring made of a metal material. The first conductive assembly 23 may include a decorative ring of the front camera, and the second conductive assembly 24 may include a decorative ring of the rear camera.

The first conductive assembly 23, the conductive path on the ground plane 22, and the second conductive assembly 24 together form a conductive loop for transmission of the differential excitation current. That is, the differential excitation current is output from one signal port of the NFC chip 21, for example, from the first differential signal port 211, which is then fed into the first conductive assembly 23, and transmitted to the conductive path on the ground plane 22 via the first conductive assembly 23 and subsequently transmitted to the second conductive assembly 24 via the conductive path, and finally returns to the second differential signal port 212 of the NFC chip 21 via the second conductive assembly 24, thereby forming a complete current loop.

It could be understood that when the conductive loop transmits the differential excitation current, the first conductive assembly 23, the conductive path on the ground plane 22, and the second conductive assembly 24 can jointly generate an alternating electromagnetic field to radiate an NFC signal outwardly, thereby implementing the NFC of the electronic apparatus 100.

When the conductive loop transmits the differential excitation current, the first conductive assembly 23 generates a first NFC radiation field. The first NFC radiation field can cover a region of a certain space around the electronic apparatus 100. The second conductive assembly 24 generates a second NFC radiation field. The second NFC radiation field can also cover a region of a certain space around the electronic apparatus 100. The second NFC radiation field and the first NFC radiation field at least partially overlap, such that the field strength of a region covered by the NFC radiation fields around the electronic apparatus 100 and that of the overlapping region can be enhanced. Therefore, an effective reading and writing (card-swiping) area of an NFC antenna of the electronic apparatus 100 can be increased, and the stability of the NFC antenna of the electronic apparatus 100 during reading and writing (card swiping) can be improved.

In addition, when the conductive loop transmits the differential excitation current, the ground plane 22 can generate a third NFC radiation field. The third NFC radiation field can also cover a region of a certain space around the electronic apparatus 100. The third NFC radiation field and the first NFC radiation field at least partially overlap, and the third NFC radiation field and the second NFC radiation field at least partially overlap. Therefore, the field strength of a region covered by the NFC radiation fields around the electronic apparatus 100 and that of the overlapping regions can be enhanced.

For example, in practical applications, when an NFC receiver (such as a subway card-swiping machine) is close to a position of the first conductive assembly 23 and reads an NFC signal, the first NFC radiation field generated by the first conductive assembly 23 acts as a main radiation field, and the second NFC radiation field generated by the second conductive assembly 24 and the third NFC radiation field generated by the ground plane 22 can compensate the main radiation field, such that positions where the field strength is weak in the main radiation field can be compensated, to enhance the field strength of the entire region of the main radiation field. Similarly, when the NFC receiver is close to a position of the second conductive assembly 24 and reads an NFC signal, the second NFC radiation field generated by the second conductive assembly 24 acts as a main radiation field, and both the first NFC radiation field and the third NFC radiation field can compensate the main radiation field.

Therefore, the antenna device 200 of the present disclosure can ensure that in the electronic apparatus 100, reception and transmission of the NFC signal can be performed at any position in the overall NFC radiation field generated by the first conductive assembly 23, the second conductive assembly 24, and the ground plane 22, thereby implementing the NFC between the electronic apparatus 100 and other electronic apparatuses.

Figure 3:
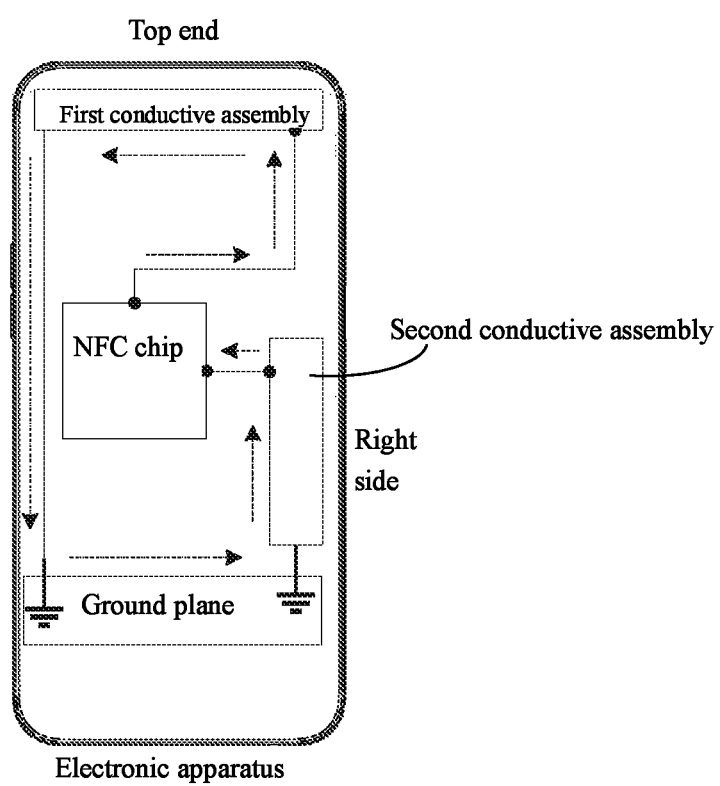
FIG. 3 illustrates a schematic view of arrangement of the antenna device of FIG. 2 in an electronic apparatus.

FIG. 3 illustrates a schematic view of arrangement of the antenna device of FIG. 2 in an electronic apparatus.

The NFC chip can be integrated on a circuit board of the electronic apparatus. The first conductive assembly can be arranged on an end of the electronic apparatus, and for example, the first conductive assembly can be arranged on a top end of the electronic apparatus. The ground plane can be formed on the circuit board of the electronic apparatus. The second conductive assembly may be arranged on a side of the electronic apparatus, and for example, the second conductive assembly may be arranged on a right side of the electronic apparatus. Therefore, the differential excitation current provided by the NFC chip can be transmitted from the NFC chip to the first conductive assembly on the top end of the electronic apparatus, then transmitted from the first conductive assembly to the ground plane on the circuit board of the electronic apparatus, subsequently transmitted from the ground plane on the circuit board to the second conductive assembly on the right side of the electronic apparatus, and finally returns to the NFC chip from the second conductive assembly.

It should be noted that the arrangement of the first conductive assembly on the top end of the electronic apparatus and the arrangement of the second conductive assembly on the right side of the electronic apparatus are merely examples, and are not intended to limit the embodiments of the present disclosure. It could be understood that the first conductive assembly can also be arranged at other parts of the electronic apparatus, and the second conductive assembly can also be arranged at other parts of the electronic apparatus, such that the NFC can be implemented between different parts of the electronic apparatus and other electronic apparatuses. For example, the NFC can be implemented through a front side of the electronic apparatus (that is, a side where a display screen of the electronic apparatus is located) or through a rear side of the electronic apparatus (that is, a side where a battery cover of the electronic apparatus is located).

It should be noted that when the electronic apparatus radiates NFC signals outwardly, the NFC chip in the electronic apparatus can actively provide a differential excitation current. When the electronic apparatus serves as an NFC receiver and receives NFC signals radiated from other electronic apparatuses, the antenna device in the electronic apparatus can generate an induced current, and the induced current can also be understood as the differential excitation current provided by the NFC chip or understood as a differential excitation current passively provided by the NFC chip. That is, whether the electronic apparatus acts as an NFC transmitter to radiate NFC signals outwardly or acts as the NFC receiver to receive NFC signals radiated by other electronic apparatuses, the NFC chip in the electronic apparatus can provide the differential excitation current.

In the antenna device according to the embodiments of the present disclosure, by providing the two conductive assemblies in the antenna device and coupling the two conductive assemblies to two different ground points on the same ground plane, and by utilizing a ground plane between the two ground points to form the conductive path, the conductive loop for transmission of the differential excitation current of the NFC can be formed by the two conductive assemblies and the conductive path. The two conductive assemblies can be separately arranged at different parts of the electronic apparatus according to design requirements of an internal space of the electronic apparatus, and then be coupled by the conductive path formed on the ground plane to form the conductive loop, such that the design of the NFC antenna can be realized by the conductive assemblies at different parts of the electronic apparatus in cooperation with the ground plane, thereby saving the space occupied by the NFC antenna and making the layout of the NFC antenna more flexible.

Figure 4:
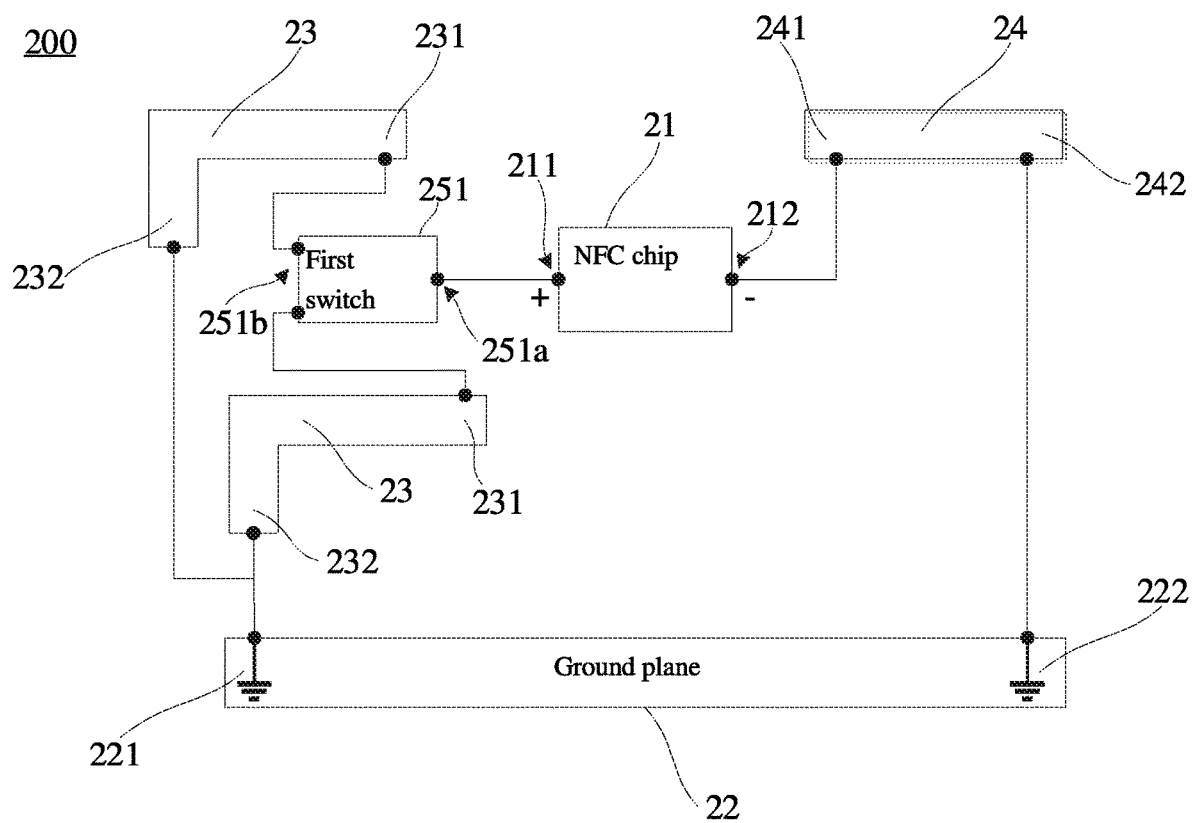
FIG. 4 illustrates a structural schematic view of a second embodiment of an antenna device according to the present disclosure.

FIG. 4 illustrates a structural schematic view of a second embodiment of the antenna device 200 according to the present disclosure. A plurality of first conductive assemblies 23 are provided. For example, two first conductive assemblies 23 are shown in FIG. 4. It could be understood that the term "a plurality of" means two or more than two. It should be noted that, the plurality of first conductive assemblies 23 are arranged at different positions in the electronic apparatus 100, such that the electronic apparatus 100 can radiate NFC signals outwardly through the first conductive assemblies 23 at different positions. That is, the electronic apparatus 100 can implement the NFC with other electronic apparatuses through its own different parts. For example, the plurality of first conductive assemblies 23 may be arranged at different parts, such as a top end, a bottom end, a left side, and a right side of the electronic apparatus 100.

In addition, the materials and specifications of the plurality of first conductive assemblies 23 may be the same or may be different. In the electronic apparatus 100, metal structures or metal traces configured to form each of the first conductive assemblies 23 may be the same or may be different.

Each of the first conductive assemblies 23 includes a first feed port 231 and a first ground port 232 spaced apart from each other. Each first ground port 232 is electrically coupled to the first ground point 221 of the ground plane 22.

The antenna device 200 further includes a first switch 251. The first switch 251 is arranged between the NFC chip 21 and the plurality of first conductive assemblies 23. The first switch 251 includes a first pole port 251a and a first throw port 251b. The first pole port 251a is coupled to the first differential signal port 211 of the NFC chip 21. The first throw port 251b is coupled to the first feed port 231 of each first conductive assembly 23, so as to realize electrical connection between the first feed port 231 of each first conductive assembly 23 and the first differential signal port 211 of the NFC chip 21. As a result, the first differential signal port 211 can feed power to the first feed port 231 of each first conductive assembly 23. It could be understood that the first throw port 251b can include a plurality of ports, and each of the ports is coupled to the first feed port 231 of one first conductive assembly 23. The first pole port 251a can selectively in communication with one or more ports of the first throw port 251b.

Therefore, the first switch 251 can be configured to selectively allow the first differential signal port 211 to be in communication with one or more of the first conductive assemblies 23. That is, the first switch 251 can allow the first differential signal port 211 to be in communication with one first conductive assembly 23, and can also allow the first differential signal port 211 to be in communication with two or more first signal ports 211 simultaneously. For example, the first switch 251 can be controlled by a processor of the electronic apparatus 100, and hence the first switch 251 is controlled to selectively allow the first differential signal port 211 to be in communication with one or more of the first conductive assemblies 23.

It could be understood that the first switch 251 may include a single-pole multi-throw switch, a double-pole multi-throw switch, a multi-pole multi-throw switch, and other types of switches. For example, the first switch 251 may include a single-pole double-throw switch configured to be in communication with one first conductive assembly 23 selected from two first conductive assemblies 23. For another example, the first switch 251 may include a double-pole four-throw switch configured to be in communication with two first conductive assemblies 23 selected from four first conductive assemblies 23. For still another example, the first switch 251 may further include a three-pole six-throw switch configured to be in communication with three first conductive assemblies 23 selected from six first conductive assemblies 23.

It should be noted that the term "couple" in the embodiments of the present disclosure refers to a physical connection between two devices or ports, and the two devices or ports coupled to each other are not necessarily in an electrically conductive state. However, the term "in communication" means that two devices or ports are in an electrically conductive state, and electrical signals can be transmitted between the two devices or ports that are in communication with each other.

When the conductive loop in the antenna device 200 transmits the differential excitation current provided by the NFC chip 21, the first conductive assembly 23 communicating with the first differential signal port 211, the conductive path formed on the ground plane 22, and the second conductive assembly 24 together constitute the conductive loop for the transmission of the differential excitation current.

In the antenna device 200 according to the embodiment of the present disclosure, by providing the plurality of first conductive assemblies 23 and the second conductive assembly 24 in the antenna device, and coupling the plurality of first conductive assemblies 23 and the second conductive assembly 24 to two different ground points on the same ground plane 22, and by utilizing a ground plane between the two ground points to form the conductive path, the conductive loop for the transmission of the differential excitation current of NFC can be formed by the plurality of first conductive assemblies 23, the second conductive assembly 24, and the conductive path. The plurality of first conductive assemblies 23 and the second conductive assembly 24 can be separately arranged at different parts of the electronic apparatus according to design requirements of an internal space of the electronic apparatus, and then be coupled by the conductive path formed on the ground plane to form the conductive loop, such that the design of the NFC antenna can be realized by the conductive assemblies at different parts of the electronic apparatus in cooperation with the ground plane, and the NFC can be implemented through the conductive assemblies at different parts of the electronic apparatus, thereby improving the convenience of the NFC of the electronic apparatus.

Figure 5:
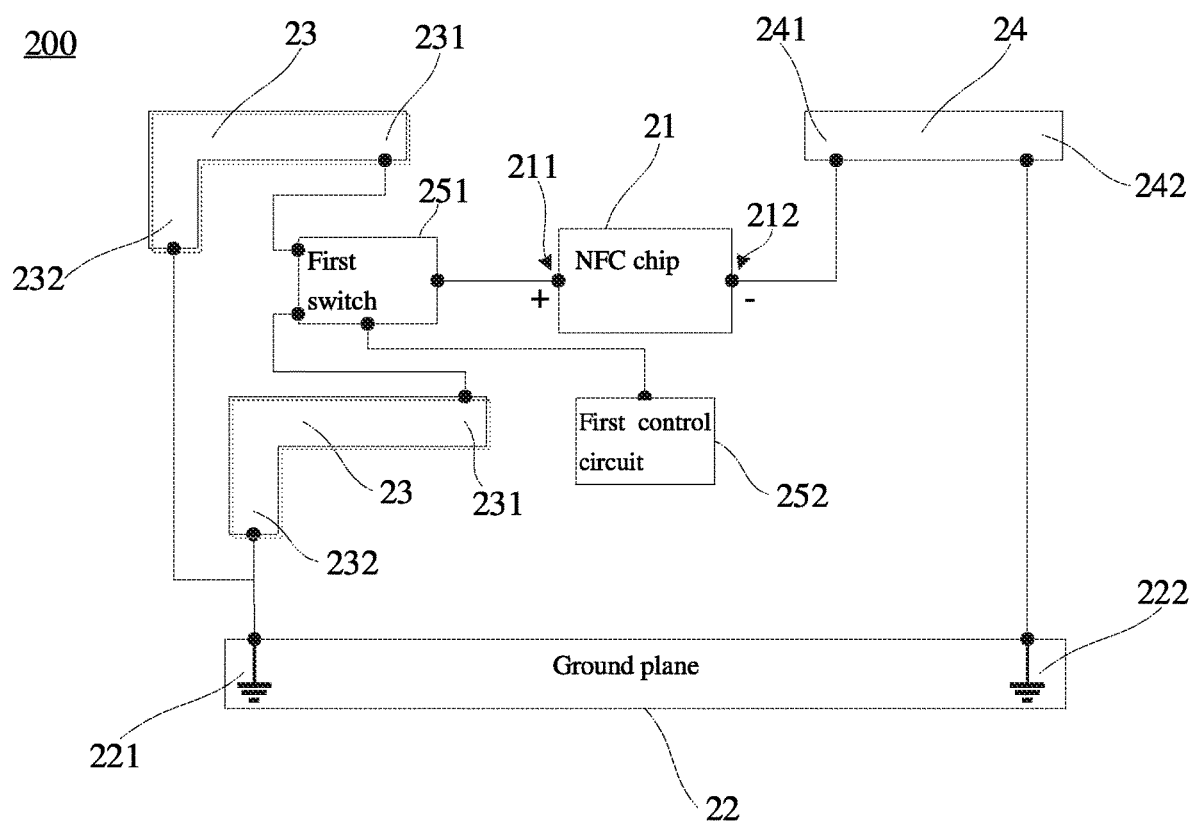
FIG. 5 illustrates a structural schematic view of a third embodiment of an antenna device according to the present disclosure.

FIG. 5 illustrates a structural schematic view of a third embodiment of the antenna device 200 according to the present disclosure. The antenna device 200 further includes a first control circuit 252. The first control circuit 252 can be integrated on the circuit board 30 of the electronic apparatus 100.

The first control circuit 252 is electrically coupled to the first switch 251. The first control circuit 252 is configured to control switching of the first switch 251, so as to control the first switch 251 to selectively allow the first differential signal port 211 of the NFC chip 21 to be in communication with one or more of the first conductive assemblies 23.

It could be understood that, in practical applications, the first control circuit 252 may be configured to control the switching of the first switch 251 according to the radiation signal intensity of each first conductive assembly 23.

The first control circuit 252 can control the first switch 251 to be in communication with each first conductive assembly 23 briefly in sequence, so as to detect the radiation signal intensity when each first conductive assembly 23 transmits the differential excitation current. It could be understood that the radiation signal intensity is the radiation signal intensity of the NFC signal radiated outwards when each first conductive assembly 23 transmits the differential excitation current.

Subsequently, the first control circuit 252 determines a target first conductive assembly from the plurality of first conductive assemblies 23 according to the radiation signal intensity of each first conductive assembly 23, and controls the first switch 251 to allow the first differential signal port 211 of the NFC chip 21 to be in communication with the target first conductive assembly. The target first conductive assembly is a conductive assembly with the strongest radiation signal intensity from the plurality of first conductive assemblies 23. It could be understood that when there is one conductive assembly with the strongest radiation signal intensity from the plurality of first conductive assemblies 23, there may be one target first conductive assembly; when there is a plurality of conductive assemblies with the strongest radiation signal intensity from the plurality of first conductive assemblies 23, there may be a plurality of target first conductive assemblies.

For example, the antenna device 200 includes four first conductive assemblies K1, K2, K3, and K4. From them, the radiation signal intensity of K1 is 30 dbm (decibel milliwatts), the radiation signal intensity of K2 is 35 dbm, the radiation signal intensity of K3 is 35 dbm, and the radiation signal intensity of K4 is 20 dbm. In such a case, the first control circuit 252 can determine that K2 and K3 are the conductive assemblies with the strongest radiation signal strength, and determine K2 and K3 as the target first conductive assemblies. Subsequently, the first switch 251 is controlled to allow the first differential signal port 211 to be in communication with the first conductive assemblies K2 and K3.

It could be understood that the first control circuit 252 determines the conductive assembly with the strongest radiation signal intensity from the plurality of first conductive assemblies 23 as the target first conductive assembly, and controls the first switch 251 to be in communication with the target first conductive assembly, such that the electronic apparatus 100 can perform the NFC with other electronic apparatuses through the first conductive assembly 23 having the strongest radiation signal strength, thereby improving the stability and communication efficiency when the electronic apparatus 100 performs the NFC.

In practical applications, the first control circuit 252 may be further configured to control the switching of the first switch 251 according to a distance between each first conductive assembly 23 and an external object.

A distance sensor can be provided at a position where each first conductive assembly 23 is located. The distance sensor may be, for example, an infrared sensor, a capacitance sensor, or the like. The distance sensor can be configured to detect the distance between the first conductive assembly 23 at the position and the external object. An NFC receiver may be provided on the external object. For example, the external object may be an apparatus such as a subway card-swiping machine or a bus card-swiping machine.

The first control circuit 252 can detect the distance between each of the first conductive assemblies 23 and the external object sequentially through the distance sensors at the positions where the first conductive assemblies 23 are separately located. Subsequently, a target first conductive assembly is determined from the plurality of first conductive assemblies 23 according to the distance between each of the first conductive assemblies 23 and the external object, and the first switch 251 is controlled to allow the first differential signal port 211 of the NFC chip 21 to be in communication with the target first conductive assembly. The target first conductive assembly is a conductive assembly from the plurality of first conductive assemblies 23 having the smallest distance from the external object. It could be understood that when there is one conductive assembly from the plurality of first conductive assemblies 23 having the smallest distance from the external object, there may be one target first conductive assembly; when there is a plurality of conductive assemblies from the plurality of first conductive assemblies 23 having the smallest distance from the external object, there may be a plurality of target first conductive assemblies.

For example, the antenna device 200 includes four first conductive assemblies K1, K2, K3, and K4. From them, a distance between K1 and the external object is 5 mm, a distance between K2 and the external object is 20 mm, a distance between K3 and the external object is 8 mm, and a distance between K4 and the external object is 100 mm. In such a case, the first control circuit 252 can determine K1 as the conductive assembly with the smallest distance from the external object, and determine K1 as the target first conductive assembly. Subsequently, the first switch 251 is controlled to allow the first differential signal port 211 to be in communication with the first conductive assembly K1.

It could be understood that the first control circuit 252 determines the conductive assembly from the plurality of first conductive assemblies 23 having the smallest distance from the external object as the target first conductive assembly, and controls the first switch 251 to be in communication with the target first conductive assembly, such that the electronic apparatus 100 can perform the NFC with other electronic apparatuses through the first conductive assembly 23 having the smallest distance from the external object, thereby ensuring the NFC reliability and improving the stability and efficiency when the electronic apparatus 100 performs the NFC.

Figure 6:
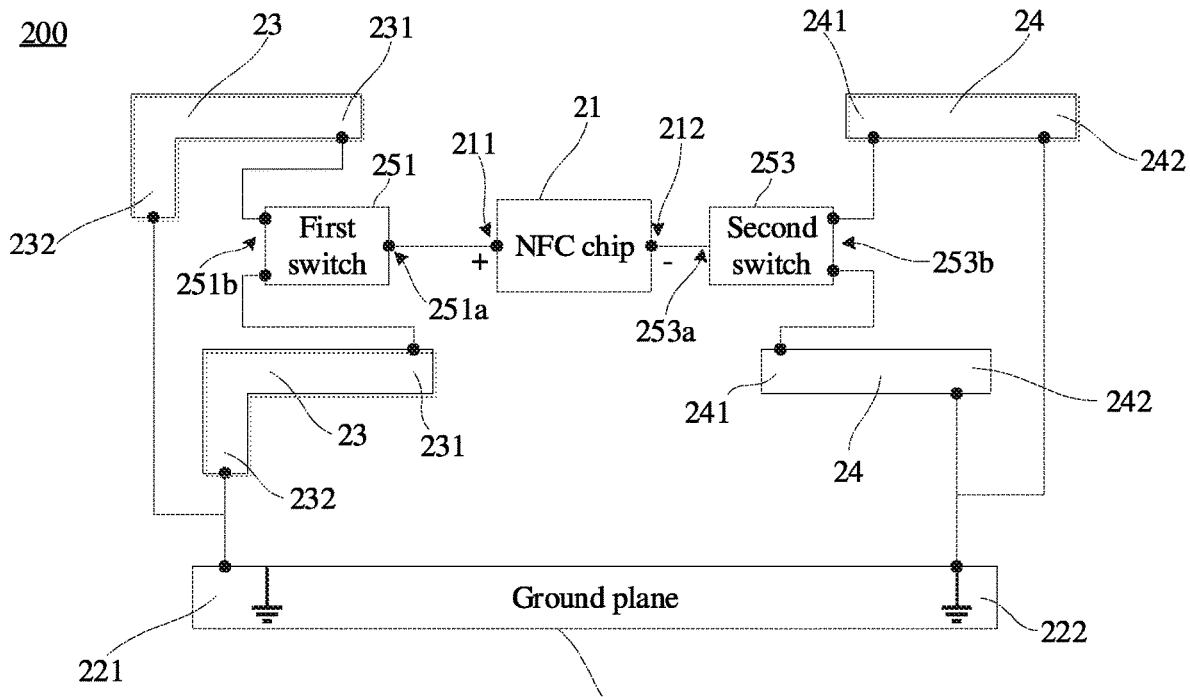
FIG. 6 illustrates a structural schematic view of a fourth embodiment of an antenna device according to the present disclosure.

FIG. 6 illustrates a structural schematic view of a fourth embodiment of the antenna device 200 according to the present disclosure. A plurality of second conductive assemblies 24 are provided, such as two second conductive assemblies 24 shown in FIG. 6. It should be noted that the plurality of second conductive assemblies 24 are arranged at different positions in the electronic apparatus 100, such that the electronic apparatus 100 can radiate NFC signals through the second conductive assemblies 24 at different positions. That is, the electronic apparatus 100 can implement the NFC with other electronic apparatuses through different parts of the electronic apparatus 100. For example, the plurality of second conductive assemblies 24 may be arranged at different parts, such as a top end, a bottom end, a left side, and a right side of the electronic apparatus 100.

In addition, the materials and specifications of the plurality of second conductive assemblies 24 may be the same or may be different. In the electronic apparatus 100, metal structures or metal traces configured to form each of the second conductive assemblies 24 may be the same or may be different.

Each of the second conductive assemblies 24 includes a second feed port 241 and a second ground port 242 spaced apart from each other. Each second ground port 242 is electrically coupled to the second ground point 222 of the ground plane 22.

The antenna device 200 further includes a second switch 253. The second switch 253 is arranged between the NFC chip 21 and the plurality of second conductive assemblies 24. The second switch 253 includes a second pole port 253a and a second throw port 253b. The second pole port 253a is coupled to the second differential signal port 212 of the NFC chip 21. The second throw port 253b is coupled to the second feed port 241 of each second conductive assembly 24, so as to realize electrical connection between the second feed port 241 of each second conductive assembly 24 and the second differential signal port 212 of the NFC chip. As a result, the second differential signal port 212 can feed power to the second feed port 241 of each second conductive assembly 24. It could be understood that the second throw port 253b may include a plurality of ports, and each of the ports is coupled to the second feed port 241 of one second conductive assembly 24. The second pole port 253a can be selectively coupled with one or more ports of the second throw port 253b.

Therefore, the second switch 253 can be configured to selectively allow the second differential signal port 212 to be in communication with one or more of the second conductive assemblies 24. That is, the second switch 253 can allow the second differential signal port 212 to be in communication with one second conductive assembly 24, and can also allow the second differential signal port 212 to be in communication with two or more first signal structures simultaneously. For example, the second switch 253 can be controlled by a processor of the electronic apparatus 100, and hence the second switch 253 is controlled to selectively allow the second differential signal port 212 to be in communication with one or more of the second conductive assemblies 24.

It could be understood that the second switch 253 may also include a single-pole multi-throw switch, a double-pole multi-throw switch, a multi-pole multi-throw switch, and other types of switches. For example, the second switch 253 may include a single-pole double-throw configured to be in communication with one second conductive assembly 24 selected from two second conductive assemblies 24. For another example, the second switch 253 may include a double-pole four-throw switch configured to be in communication with two second conductive assemblies 24 selected from four second conductive assemblies 24. For still another example, the second switch 253 may further include a three-pole six-throw switch configured to be in communication with three second conductive assemblies 24 selected from six second conductive assemblies 24.

When the conductive loop in the antenna device 200 transmits the differential excitation current provided by the NFC chip 21, the first conductive assembly 23 communicating with the first differential signal port 211, the conductive path formed on the ground plane 22, and the second conductive assembly 24 communicating with the second differential signal port 212 together constitute the conductive loop for the transmission of the differential excitation current.

In the antenna device 200 according to the embodiment of the present disclosure, by providing the plurality of first conductive assemblies 23 and the plurality of second conductive assemblies 24 in the antenna device 200, selectively communicating one or more of the first conductive assemblies 23 through the first switch 251, and selectively communicating one or more of the second conductive assemblies 24 through the second switch 253, the different excitation current can be transmitted through different first conductive assemblies 23 and different second conductive assemblies 24, and hence NFC signals can be radiated outwardly through different first conductive assemblies 23 and different second conductive assemblies 24. The plurality of first conductive assemblies 23 and the plurality of second conductive assemblies 24 may be arranged at different parts of the electronic apparatus 100, such that the NFC with other electronic apparatuses can be implemented through different parts of the electronic apparatus 100, thereby further improving the convenience of the NFC performed by the electronic apparatus.

Figure 7:
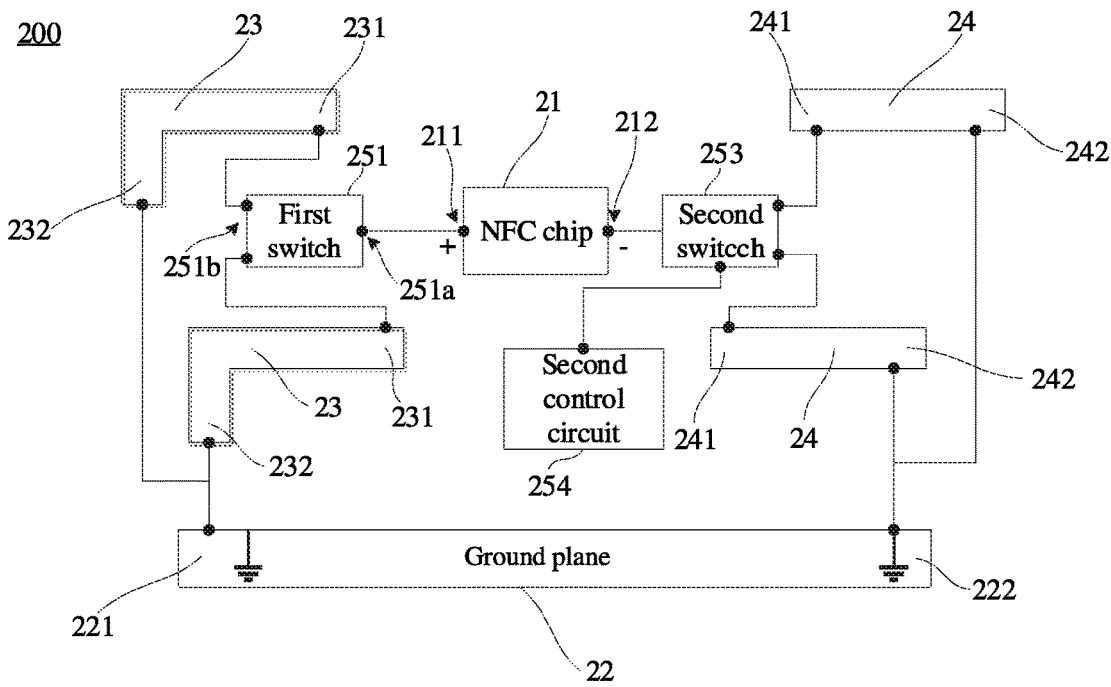
FIG. 7 illustrates a structural schematic view of a fifth embodiment of an antenna device according to the present disclosure.

FIG. 7 illustrates a structural schematic view of a fifth embodiment of the antenna device 200 according to the present disclosure. The antenna device 200 further includes a second control circuit 254. The second control circuit 254 can be integrated on the circuit board 30 of the electronic apparatus 100.

The second control circuit 254 is electrically coupled to the second switch 253. The second control circuit 254 is configured to control switching of the second switch 253, so as to control the second switch 253 to selectively allow the second differential signal port 212 of the NFC chip 21 to be in communication with one or more of the second conductive assemblies 24.

It could be understood that, in practical applications, the second control circuit 254 can be configured to control the switching of the second switch 253 according to the radiation signal intensity of each second conductive assembly 24.

The second control circuit 254 can control the second switch 253 to be in communication with each second conductive assembly 24 briefly in sequence, so as to detect the radiation signal intensity when each second conductive assembly 24 transmits the differential excitation current. It could be understood that the radiation signal intensity is the radiation signal intensity of the NFC signal radiated outwards when each second conductive assembly 24 transmits the differential excitation current.

Subsequently, the second control circuit 254 determines a target second conductive assembly from the plurality of second conductive assemblies 24 according to the radiation signal intensity of each second conductive assembly 24, and controls the second switch 253 to allow the second differential signal port 212 of the NFC chip 21 to be in communication with the target second conductive assembly. The target second conductive assembly is a conductive assembly with the strongest radiation signal intensity from the plurality of second conductive assemblies 24. It could be understood that when there is one conductive assembly with the strongest radiation signal intensity from the plurality of second conductive assemblies 24, there may be one target second conductive assembly; when there is a plurality of conductive assemblies with the strongest radiation signal intensity from the plurality of second conductive assemblies 24, there may be a plurality of target second conductive assemblies.

For example, the antenna device 200 includes four second conductive assemblies K5, K6, K7, and K8. From them, the radiation signal intensity of K5 is 30 dbm (decibel milliwatts), the radiation signal intensity of K6 is 35 dbm, the radiation signal intensity of K7 is 50 dbm, and the radiation signal intensity of K8 is 20 dbm. In such a case, the second control circuit 254 can determine that K7 is the conductive assembly with the strongest radiation signal strength, and determine K7 as the target second conductive assembly. Subsequently, the second switch 253 is controlled to allow the second differential signal port 212 to be in communication with the second conductive assembly K7.

It could be understood that the second control circuit 254 determines the conductive assembly with the strongest radiation signal intensity from the plurality of second conductive assemblies 24 as the target second conductive assembly, and controls the second switch 253 to be in communication with the target second conductive assembly, such that the electronic apparatus 100 can perform the NFC with other electronic apparatuses through the second conductive assembly 24 having the strongest radiation signal strength, thereby improving the stability and communication efficiency when the electronic apparatus 100 performs the NFC.

In practical applications, the second control circuit 254 can be further configured to control the switching of the second switch 253 according to a distance between each second conductive assembly 24 and an external object.

A distance sensor can be provided at a position where each second conductive assembly 24 is located. The distance sensor may be, for example, an infrared sensor, a capacitance sensor, or the like. The distance sensor can be configured to detect the distance between the second conductive assembly 24 at the position and the external object. An NFC receiver may be provided on the external object. For example, the external object may be an apparatus such as a subway card-swiping machine or a bus card-swiping machine.

The second control circuit 254 can detect the distance between each of the second conductive assemblies 24 and the external object sequentially through the distance sensors at the positions where the second conductive assemblies 23 are separately located. Subsequently, a target second conductive assembly is determined from the plurality of second conductive assemblies 24 according to the distance between each of the second conductive assemblies 24 and the external object, and the second switch 253 is controlled to allow the second differential signal port 212 of the NFC chip 21 to be in communication with the target second conductive assembly. The target second conductive assembly is a conductive assembly from the plurality of second conductive assemblies 24 having the smallest distance from the external object. It could be understood that when there is one conductive assembly from the plurality of second conductive assemblies 24 having the smallest distance from the external object, there may be one target second conductive assembly; when there is a plurality of conductive assemblies having the smallest distance from the external object from the plurality of second conductive assemblies, there may be a plurality of target second conductive assemblies.

For example, the antenna device 200 includes four second conductive assemblies K5, K6, K7, and K8. From them, a distance between K5 and the external object is 5 mm, a distance between K6 and the external object is 20 mm, a distance between K7 and the external object is 5 mm, and a distance between K8 and the external object is 100 mm. In such a case, the second control circuit 254 can determine K5 and K7 as the conductive assemblies with the smallest distance from the external object, and determine K5 and K7 as the target second conductive assemblies. Subsequently, the second switch 253 is controlled to allow the second differential signal port 212 to be in communication with the second conductive assemblies K5 and K7.

It could be understood that the second control circuit 254 determines the conductive assembly from the plurality of second conductive assemblies 24 having the smallest distance from the external object as the target second conductive assembly, and controls the second switch 253 to be in communication with the target second conductive assembly, such that the electronic apparatus 100 can perform the NFC with other electronic apparatuses through the second conductive assembly 24 having the smallest distance from the external object, thereby ensuring the NFC reliability and improving the stability and efficiency when the electronic apparatus 100 performs the NFC.

Figure 8:
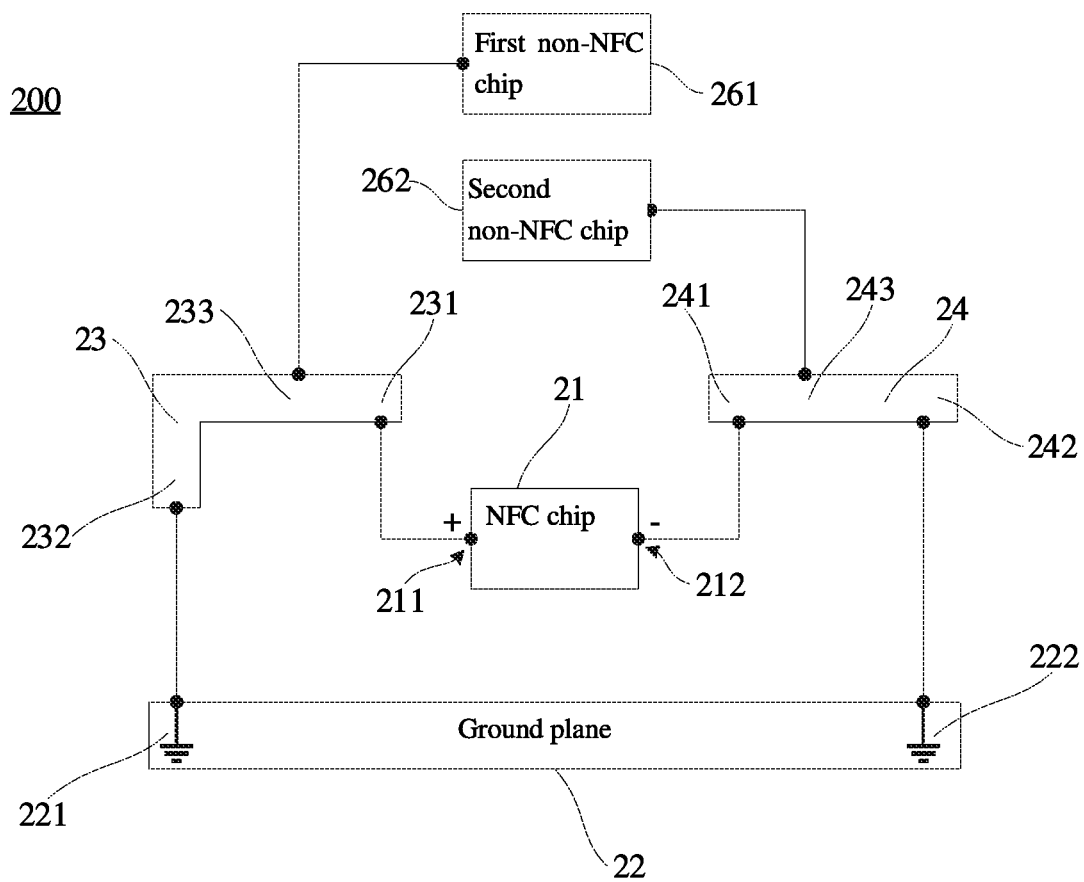
FIG. 8 illustrates a structural schematic view of a sixth embodiment of an antenna device according to the present disclosure.

FIG. 8 illustrates a structural schematic view of a sixth embodiment of the antenna device 200 according to the present disclosure. The antenna device 200 further includes a first non-near-field communication chip 261 and a second non-near-field communication chip 262. It could be understood that both the first non-near-field communication chip 261 and the second non-near-field communication chip 262 can be integrated on the circuit board 30 of the electronic apparatus 100.

The first non-near-field communication chip 261 is configured to provide a first non-near-field communication excitation signal. The first non-near-field communication excitation signal is an unbalanced signal. The first non-near-field communication excitation signal may include one of a cellular network signal, a wireless fidelity signal (Wi-Fi® signal), a global positioning system signal (GPS signal), and a Bluetooth® signal (BT signal). Accordingly, the first non-near-field communication chip 261 may be a cellular communication chip for providing the cellular network signal; the first non-near-field communication chip 261 may be a Wi-Fi chip for providing the Wi-Fi signal; the first non-near-field communication chip 261 may be a GPS chip for providing the GPS signal; the first non-near-field communication chip 261 may also be a BT chip for providing the BT signal.

Each first conductive assembly 23 further includes a third feed port 233. The third feed port 233 is spaced apart from the first feed port 231 and the first ground port 232. The third feed port 233 is electrically coupled to the first non-near-field communication chip 261, and the first non-near-field communication chip 261 is grounded. Therefore, the first non-near-field communication chip 261 can feed the first non-near-field communication excitation signal into the first conductive assembly 23 through the third feed port 233. Therefore, each first conductive assembly 23 can also be configured to transmit the first non-near-field communication excitation signal.

It could be understood that the first conductive assembly 23 can be configured to transmit both the differential excitation current provided by the NFC chip 21 and the first non-near-field communication excitation signal provided by the first non-near-field communication chip 261, thereby realizing the multiplexing of the first conductive assembly 23, so as to reduce the number of conductive assemblies configured to transmit wireless signals in the electronic apparatus 100 and save the internal space of the electronic apparatus 100.

It should be noted that the frequency of NFC signals is usually 13.56 MHz (megahertz), the frequency of cellular network signals is usually above 700 MHz, the frequency of Wi-Fi signals is usually 2.4 GHz (Gigahertz) or 5 GHz, the frequency of GPS signals usually includes 1.575 GHz, 1.227 GHz, 1.381 GHz, 1.841 GHz and other frequency bands, and the frequency of BT signals is usually 2.4 GHz. Therefore, compared with cellular network signals, Wi-Fi signals, GPS signals, and BT signals, NFC signals are low-frequency signals, while cellular network signals, Wi-Fi signals, GPS signals, and BT signals are all high-frequency signals. It could also be understood that an NFC signal is a low-frequency signal, the first non-near-field communication excitation signal is a high-frequency signal, and the frequency of the NFC signal is lower than the frequency of the first non-near-field communication excitation signal.

In addition, it should be noted that during transmission of a wireless signal, the lower the frequency of the wireless signal is, the longer the required radiator length is; and the higher the frequency of the wireless signal is, the shorter the required radiator length is. That is, a length of a radiator required for transmitting the NFC signal is greater than a length of a radiator required for transmitting the first non-near-field communication excitation signal.

Therefore, in each first conductive assembly 23, a distance between the first feed port 231 and the first ground port 232 is greater than a distance between the third feed port 233 and the first ground port 232. As a result, in the first conductive assembly 23, the length of the radiator transmitting the NFC signal is greater than the length of the radiator transmitting the first non-near-field communication excitation signal.

Moreover, in order to reduce the overall length of the first conductive assembly 23, the third feed port 233 and the first feed port 231 can be located at the same side of the first ground port 232. That is, the third feed port 233 is located between the first feed port 231 and the first ground port 232. Compared with the situation where the third feed port 233 and the first feed port 231 are located at different sides of the first ground port 232, since the third feed port 233 and the first feed port 231 are located at the same side of the first ground port 232, a portion between the third feed port 233 and the first ground port 232 can be multiplexed, thereby reducing the overall length of the first conductive assembly 23.

The second non-near-field communication chip 262 is configured to provide a second non-near-field communication excitation signal. The second non-near-field communication excitation signal is an unbalanced signal. The second non-near-field communication excitation signal may include one of a cellular network signal, a wireless fidelity signal (Wi-Fi® signal), a global positioning system signal (GPS signal), and a Bluetooth® signal (BT signal). Correspondingly, the second non-near-field communication chip 262 may be a cellular communication chip for providing the cellular network signal; the second non-near-field communication chip 262 may be a Wi-Fi chip for providing the Wi-Fi signal; the second non-near-field communication chip 262 may be a GPS chip for providing the GPS signal; the second non-near-field communication chip 262 may also be a BT chip for providing the BT signal.

It should be noted that the second non-near-field communication excitation signal and the first non-near-field communication excitation signal may be signals of the same communication type or may be signals of different communication types. Correspondingly, the second non-near-field communication chip 262 and the first non-near-field communication chip 261 may be chips of the same type or may be chips of different types.

Each second conductive assembly 24 further includes a fourth feed port 243. The fourth feed port 243 is spaced apart from the second feed port 241 and the second ground port 242. The fourth feed port 243 is electrically coupled to the second non-near-field communication chip 262, and the second non-near-field communication chip 262 is grounded. Therefore, the second non-near-field communication chip 262 can feed the second non-near-field communication excitation signal into the second conductive assembly 24 through the fourth feed port 243. Therefore, each second conductive assembly 24 can also be configured to transmit the second non-near-field communication excitation signal.

It could be understood that the second conductive assembly 24 can be configured to transmit both the differential excitation current provided by the NFC chip 21 and the second non-near-field communication excitation signal provided by the second non-near-field communication chip 262, thereby realizing the multiplexing of the second conductive assembly 24, so as to reduce the number of conductive assemblies configured to transmit wireless signals in the electronic apparatus 100 and save the internal space of the electronic apparatus 100.

Similarly, in each second conductive assembly 24, a distance between the second feed port 241 and the second ground port 242 is greater than a distance between the fourth feed port 243 and the second ground port 242. Therefore, in the second conductive assembly 24, a length of a radiator transmitting the NFC signal is greater than a length of a radiator transmitting the second non-near-field communication excitation signal.

Moreover, in order to reduce the overall length of the second conductive assembly 24, the fourth feed port 243 and the second feed port 241 may be located at the same side of the second ground port 242. That is, the fourth feed port 243 is located between the second feed port 241 and the second ground port 242. Compared with the situation where the fourth feed port 243 and the second feed port 241 are located at different sides of the second ground port 242, since the fourth feed port 243 and the second feed port 241 are located at the same side of the second ground port 242, a portion between the fourth feed port 243 and the second ground port 242 can be multiplexed, thereby reducing the overall length of the second conductive assembly 24.

Figure 9:
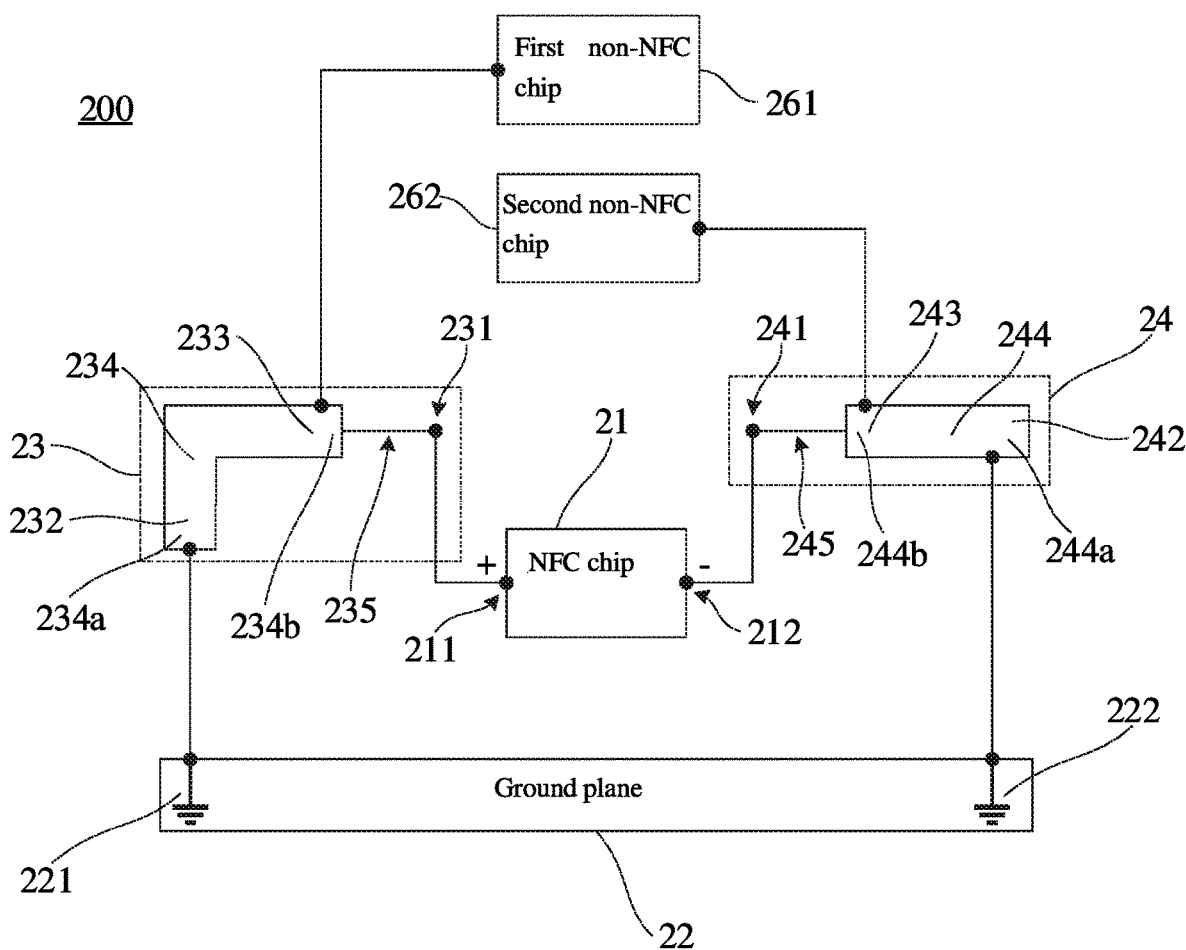
FIG. 9 illustrates a structural schematic view of a seventh embodiment of an antenna device according to the present disclosure.

FIG. 9 illustrates a structural schematic view of a seventh embodiment of the antenna device 200 according to the present disclosure.

Each first conductive assembly 23 includes a first resonating arm 234 and a first feed path 235.

The first resonating arm 234 may be formed by a metal structure in the electronic apparatus 100. For example, a gap may be provided in the middle frame of the casing 20, a metal branch is formed through the gap, and the first resonating arm 234 is formed by the metal branch. Therefore, forming the first resonating arm 234 by the middle frame of the electronic apparatus 100 can ensure that the NFC antenna has sufficient clearance space in the electronic apparatus 100, thereby improving the stability of the NFC signal. In addition, when the conductive assemblies at different positions of the middle frame are coupled through the conductive path on the ground plane 22, the length of the entire conductive loop can be extended, thereby improving an effective radiation range of the entire NFC antenna.

For another example, the first resonating arm 234 may be formed by a decoration ring of a camera in the electronic apparatus 100. For still another example, the first resonating arm 234 may also be formed by a metal trace on an FPC in the electronic apparatus 100, and the FPC may be, for example, an FPC of a display screen, an FPC of a camera, or an FPC of a motor.

The first resonating arm 234 includes a first end portion 234a and a second end portion 234b opposite to each other. The first ground port 232 is arranged at the first end portion 234a to allow the first conductive assembly 23 to be grounded. The third feed port 233 is arranged at the second end portion 234b, such that the first non-near-field communication chip 261 feeds the first non-near-field communication excitation signal into the first conductive assembly 23.

The first feed path 235 may be formed by a metal circuit in the electronic apparatus 100. For example, the first feed path 235 may be formed by a printed circuit on the circuit board 30 in the electronic apparatus 100. For another example, the first feed path 235 may also be formed by a metal wire in the electronic apparatus 100.

The first feed path 235 is electrically coupled to the second end portion 234b of the first resonating arm 234. The first feed port 231 is arranged in the first feed path 235. For example, the first feed port 231 may be arranged at an end of the first feed path 235 away from the second end portion 234b. Thus, the NFC chip 21 can feed the differential excitation current into the first conductive assembly 23.

Each second conductive assembly 24 includes a second resonating arm 244 and a second feed path 245.

The second resonating arm 244 may be formed by a metal structure in the electronic apparatus 100. For example, a gap may be provided in the middle frame of the casing 20, a metal branch is formed through the gap, and the second resonating arm 244 is formed by the metal branch. Similarly, forming the second resonating arm 244 by the middle frame of the electronic apparatus 100 can also ensure that the NFC antenna has sufficient clearance space in the electronic apparatus 100, thereby improving the stability of the NFC signal. In addition, when the conductive assemblies at different positions of the middle frame are coupled through the conductive path on the ground plane 22, the length of the entire conductive loop can be extended, thereby improving the effective radiation range of the entire NFC antenna.

For another example, the second resonating arm 244 may be formed by a decoration ring of a camera in the electronic apparatus 100. For still another example, the second resonating arm 244 may also be formed by a metal trace on an FPC in the electronic apparatus 100. The FPC may be, for example, an FPC of a display screen, an FPC of a camera, or an FPC of a motor.

The second resonating arm 244 includes a third end portion 244a and a fourth end portion 244b opposite to each other. The second ground port 242 is arranged at the third end portion 244a to allow the second conductive assembly 24 to be grounded. The fourth feed port 243 is arranged at the fourth end portion 244b, such that the second non-near-field communication chip 262 feeds the second non-near-field communication excitation signal into the second conductive assembly 24.

The second feed path 245 may be formed by a metal circuit in the electronic apparatus 100. For example, the second feed path 245 may be formed by a printed circuit on the circuit board 30 in the electronic apparatus 100. For another example, the second feed path 245 may also be formed by a metal wire in the electronic apparatus 100.

The second feed path 245 is electrically coupled to the fourth end portion 244b of the second resonating arm 244. The second feed port 241 is arranged in the second feed path 245. For example, the second feed port 241 may be arranged at an end of the second feed path 245 away from the fourth end portion 244b. Thus, the NFC chip 21 can feed the differential excitation current into the second conductive assembly 24.

Figure 10:
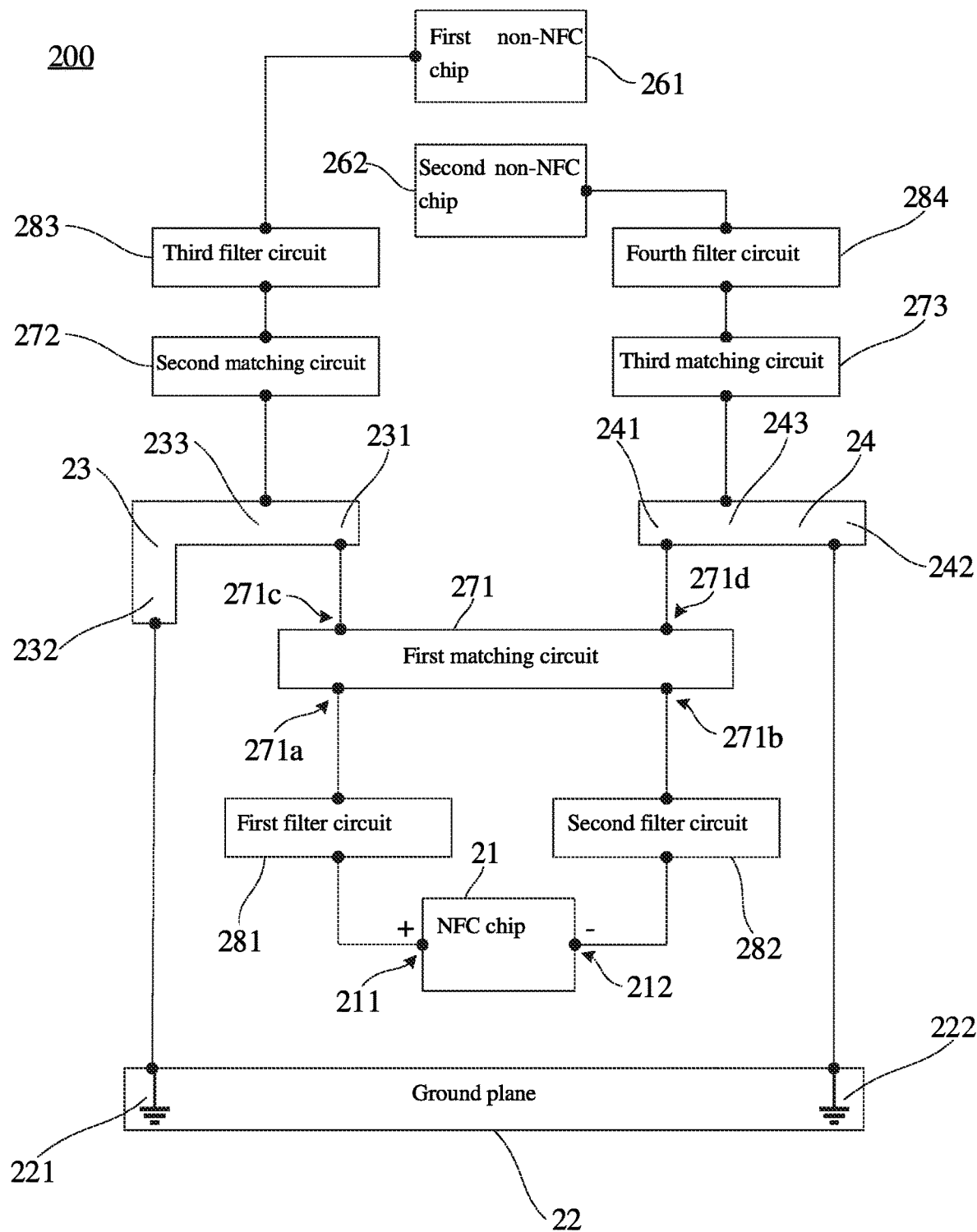
FIG. 10 illustrates a structural schematic view of an eighth embodiment of an antenna device according to the present disclosure.

FIG. 10 illustrates a structural schematic view of an eight embodiment of the antenna device 200 according to the present disclosure. The antenna device 200 further includes a first matching circuit 271, a second matching circuit 272, a third matching circuit 273, a first filter circuit 281, a second filter circuit 282, a third filter circuit 283, and a fourth filter circuit 284. It could be understood that the matching circuit may also be called a matching network, a tuning circuit, a tuning network, or the like; the filter circuit may also be called a filter network.

The first matching circuit 271 is electrically coupled to the first differential signal port 211 of the NFC chip 21, the second differential signal port 212 of the NFC chip 21, the first feed port 231 of each first conductive assembly 23, and the second feed port 241 of each second conductive assembly 24. The first matching circuit 271 is configured to match impedance when a conductive loop transmits the differential excitation current. The conductive loop is a conductive loop constituted by the first conductive assembly 23 communicating with the first differential signal port 211, the conductive path on the ground plane 22, and the second conductive assembly 24 communicating with the second differential signal port 212.

The first matching circuit 271 includes a first input port 271a, a second input port 271b, a first output port 271c, and a second output port 271d. The first input port 271a is electrically coupled to the first differential signal port 211 of the NFC chip 21, and the second input port 271b is electrically coupled to the second differential signal port 212 of the NFC chip 21. The first output port 271c is electrically coupled to the first feed port 231 of each first conductive assembly 23, and the second output port 271d is electrically coupled to the second feed port 241 of each second conductive assembly 24.

The first filter circuit 281 is arranged between the first differential signal port 211 of the NFC chip 21 and the first input port 271a of the first matching network 271. The first filter circuit 281 is configured to filter a first interference signal between the first differential signal port 211 and the first input port 271a. The first interference signal is an electrical signal provided by the NFC chip 21 other than the differential excitation current.

The second filter circuit 282 is arranged between the second differential signal port 212 of the NFC chip 21 and the second input port 271b of the first matching circuit 271. The second filter circuit 282 is configured to filter a second interference signal between the second differential signal port 212 and the second input port 271b. The second interference signal is an electrical signal provided by the NFC chip 21 other than the differential excitation current.

The second matching circuit 272 is electrically coupled to the first non-near-field communication chip 261 and the third feed port 233 of each first conductive assembly 23. The second matching circuit 272 is configured to match impedance when each first conductive assembly 23 transmits the first non-near-field communication excitation signal.

The third filter circuit 283 is arranged between the first non-near-field communication chip 25 and the second matching circuit 272. The third filter circuit 283 is configured to filter a third interference signal between the first non-near-field communication chip 25 and the second matching circuit 272. The third interference signal is an electrical signal provided by the first non-near-field communication chip 25 other than the first non-near-field communication excitation signal.

The third matching circuit 273 is electrically coupled to the second non-near-field communication chip 262 and a fourth feed port 243 of each second conductive assembly 24. The third matching circuit 273 is configured to match impedance when each second conductive assembly 24 transmits the second non-near-field communication excitation signal.

The fourth filter circuit 284 is arranged between the second non-near-field communication chip 26 and the third matching circuit 273. The fourth filter circuit 284 is configured to filter a fourth interference signal between the second non-near-field communication chip 26 and the third matching circuit 273. The fourth interference signal is an electrical signal provided by the second non-near-field communication chip 26 other than the second non-near-field communication excitation signal.

It could be understood that the first matching circuit 271, the second matching circuit 272, and the third matching circuit 273 may all include a circuit formed by any capacitors and inductors coupled in serially or parallel. The first filter circuit 281, the second filter circuit 282, the third filter circuit 283, and the fourth filter circuit 284 may also include a circuit formed by any capacitors and inductors coupled in serial or parallel.

Figure 11:
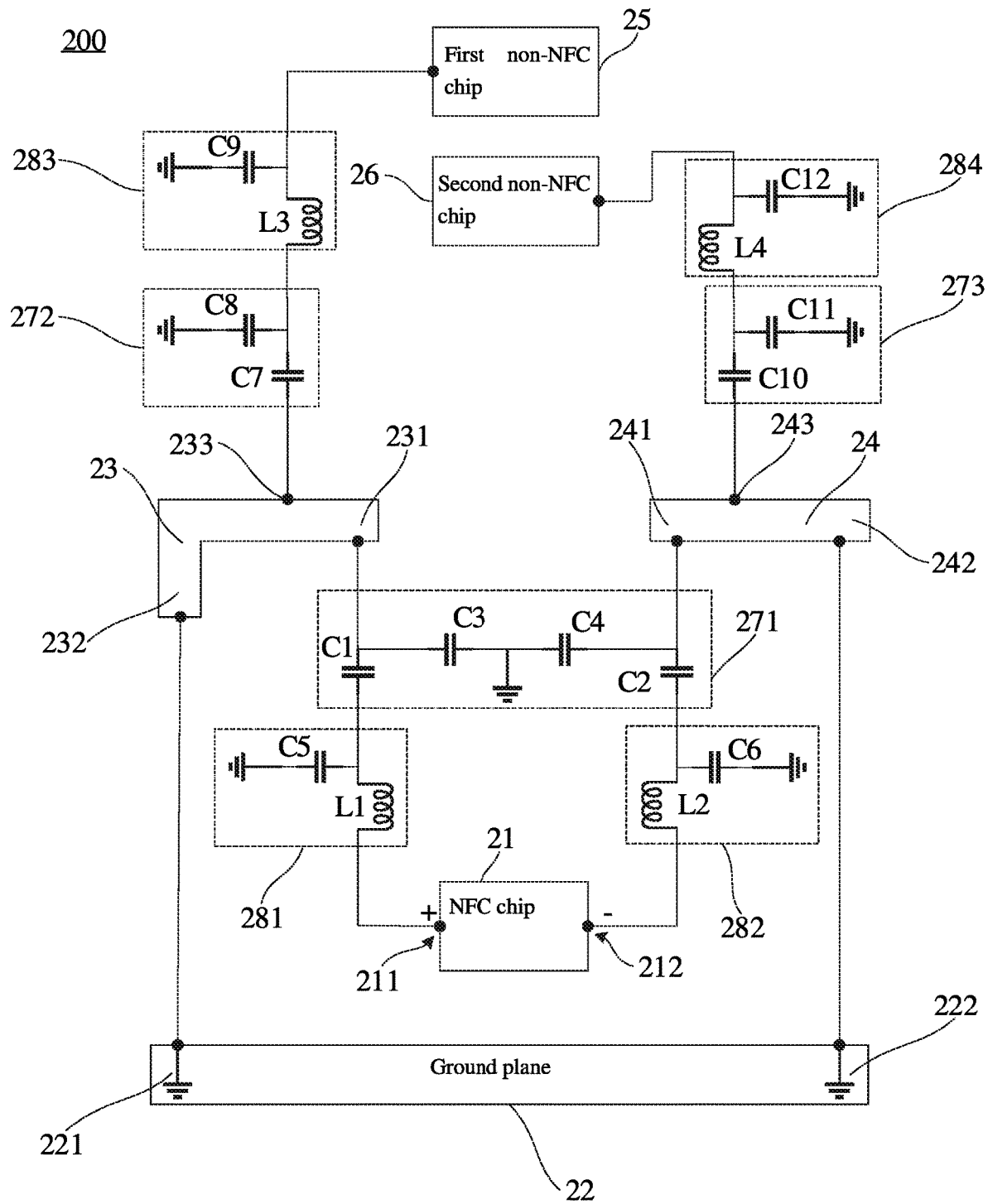
FIG. 11 illustrates a structural schematic view of a ninth embodiment of an antenna device according to the present disclosure.

FIG. 11 illustrates a structural schematic view of a ninth embodiment of the antenna device 200 according to the present disclosure.

The first matching circuit 271 may include, for example, four capacitors C1, C2, C3, and C4. The capacitor C1 is coupled in series with the first differential signal port 211 of the NFC chip 21, and the capacitor C2 is coupled in series with the second differential signal port 212 of the NFC chip 21. The capacitor C3 and the capacitor C4 are coupled in series, and then they are coupled in parallel with the NFC chip 21. It is grounded between the capacitor C3 and the capacitor C4. It could be understood that capacitance values of the capacitors C1, C2, C3, and C4 can be set according to actual needs.

The first filter circuit 281 may include, for example, an inductor L1 and a capacitor C5. The inductor L1 is coupled in series between the first differential signal port 211 and the first matching circuit 271, and the capacitor C5 is coupled in parallel with the NFC chip 21 and grounded. It could be understood that an inductance value of the inductor L1 and a capacitance value of the capacitor C5 can be set according to actual needs.

The second filter circuit 282 may include, for example, an inductor L2 and a capacitor C6. The inductor L2 is coupled in series between the second differential signal port 212 and the first matching circuit 271, and the capacitor C6 is coupled in parallel with the NFC chip 21 and grounded. It could be understood that an inductance value of the inductor L2 and a capacitance value of the capacitor C6 can be set according to actual needs.

The second matching circuit 272 may include capacitors C7 and C8, for example. The capacitor C7 is coupled in series between the third feed port 233 of the first conductive assembly 23 and the first non-near-field communication chip 25, and the capacitor C8 is coupled in parallel with the first non-near-field communication chip 25 and grounded. It could be understood that capacitance values of the capacitors C7 and C8 can be set according to actual needs.

The third filter circuit 283 may include, for example, an inductor L3 and a capacitor C9. The inductor L3 is coupled in series between the first non-near-field communication chip 25 and the second matching circuit 272, and the capacitor C9 is coupled in parallel with the first non-near-field communication chip 25 and grounded. It could be understood that an inductance value of the inductor L3 and a capacitance value of the capacitor C9 can be set according to actual needs.

The third matching circuit 273 may include capacitors C10 and C11, for example. The capacitor C10 is coupled in series between the fourth feed port 243 of the second conductive assembly 24 and the second non-near-field communication chip 26, and the capacitor C11 is coupled in parallel with the second non-near-field communication chip 26 and grounded. It could be understood that capacitance values of the capacitors C10 and C11 can be set according to actual needs.

The fourth filter circuit 284 may include, for example, an inductor L4 and a capacitor C12. The inductor L4 is coupled in series between the second non-near-field communication chip 26 and the third matching circuit 273, and the capacitor C12 is coupled in parallel with the second non-near-field communication chip 26 and grounded. It could be understood that an inductance value of the inductor L4 and a capacitance value of the capacitor C12 can be set according to actual needs.

Embodiments of the present disclosure further provide a method for antenna switching. The method can be applied to the antenna device 200 according to any one of the above embodiments. The method includes: detecting a distance between each of the first conductive assemblies and an external object; determining a target first conductive assembly from the plurality of first conductive assemblies according to the distance, the target first conductive assembly being a conductive assembly from the plurality of first conductive assemblies having the smallest distance from the external object; and controlling the first switch to allow the first differential signal port to be in communication with the target first conductive assembly.

In the antenna device 200, a distance sensor may be provided at a position where each first conductive assembly 23 is located. The distance sensor may be, for example, an infrared sensor, a capacitance sensor, or the like. The electronic apparatus can detect the distance between each of the first conductive assemblies 23 and the external object by means of the distance sensor at the position where each of the first conductive assemblies 23 is located. For example, the external object may be an NFC receiver (such as a subway card-swiping machine).

Subsequently, the electronic apparatus determines the first conductive assembly having the smallest distance from the external object as the target first conductive assembly, according to multiple detected distances.

It could be understood that determining the target first conductive assembly from the plurality of first conductive assemblies according to the distance includes: determining the conductive assembly from the plurality of first conductive assemblies having the smallest distance from the external object according to the distances; detecting a holding position when the user holds the electronic apparatus; judging whether the conductive assembly having the smallest distance from the external object is located at the holding position; determining the conductive assembly as the target first conductive assembly if the conductive assembly is not located at the holding position.

The electronic apparatus may first determine the conductive assembly from the plurality of first conductive assemblies having the smallest distance from the external object according to the detected distances. Subsequently, the electronic apparatus detects the holding position when the user holds the electronic apparatus, and judges whether the conductive assembly having the smallest distance from the external object is located at the holding position. If the conductive assembly is not located at the holding position, the conductive assembly is determined as the target first conductive assembly. If the conductive assembly is located at the holding position, the electronic apparatus can re-determine the target first conductive assembly.

The antenna device, the electronic apparatus, and the method for antenna switching provided by the embodiments of the present disclosure have been described in detail above. Specific examples are used herein to explain the principles and implementations of the present disclosure, and the description of the above embodiments is only intended to help understand the present disclosure. For those skilled in the art, based on the idea of the present disclosure, changes may be made in terms of specific implementations and the application scope. In summary, the content of this description should not be understood as limitation on the present disclosure.

What is claimed is:
1. An antenna device, comprising:
a near field communication chip comprising a first differential signal port and a second differential signal port both configured to provide a differential excitation current;
a ground plane comprising a first ground point and a second ground point spaced apart from each other, wherein a conductive path is formed between the first ground point and the second ground point;
a plurality of first conductive assemblies, each of the plurality of first conductive assemblies comprising a first feed port and a first ground port spaced apart from each other, the first ground port being electrically coupled to the first ground point;
a first switch comprising a first pole port coupled to the first differential signal port and a first throw port coupled to the first feed port of each of the plurality of first conductive assemblies, the first switch configured to selectively allow the first differential signal port to be in communication with one or more first conductive assemblies from the plurality of first conductive assemblies; and
a second conductive assembly comprising a second feed port and a second ground port spaced apart from each other, the second feed port being electrically coupled to the second differential signal port, and the second ground port being electrically coupled to the second ground point;

wherein the first conductive assembly communicating with the first differential signal port, the conductive path, and the second conductive assembly together constitute a conductive loop for transmission of the differential excitation current.

2. The antenna device according to claim 1, further comprising a first control circuit electrically coupled to the first switch and configured to control the first switch to selectively allow the first differential signal port to be in communication with the one or more first conductive assemblies.

3. The antenna device according to claim 2, wherein the first control circuit is configured to:
   detect a radiation signal intensity when each of the plurality of first conductive assemblies transmits the differential excitation current;
   determine a target first conductive assembly from the plurality of first conductive assemblies according to radiation signal intensities, the target first conductive assembly being a conductive assembly with a strongest radiation signal intensity from the plurality of first conductive assemblies; and
   control the first switch to allow the first differential signal port to be in communication with the target first conductive assembly.

4. The antenna device according to claim 2, wherein the first control circuit is configured to:
   detect a distance between each of the plurality of first conductive assemblies and an external object;
   determine a target first conductive assembly from the plurality of first conductive assemblies according to distances, the target first conductive assembly being a conductive assembly from the plurality of first conductive assemblies having the smallest distance from the external object; and
   control the first switch to allow the first differential signal port to be in communication with the target first conductive assembly.

5. The antenna device according to claim 1, wherein a plurality of second conductive assemblies are provided, and the antenna device further comprises:
   a second switch comprising a second pole port coupled to the second differential signal port, and a second throw port coupled to the second feed port of each of the plurality of second conductive assemblies to realize electrical connection between the second feed port and the second differential signal port, and configured to selectively allow the second differential signal port to be in communication with one or more second conductive assemblies from the plurality of second conductive assemblies;
   wherein the first conductive assembly communicating with the first differential signal port, the conductive path, and the second conductive assembly communicating with the second differential signal port together constitute a conductive loop for transmission of the differential excitation current.

6. The antenna device according to claim 5, further comprising a second control circuit electrically coupled to the second switch and configured to control the second switch to selectively allow the second differential signal port to be in communication with the one or more second conductive assemblies.

7. The antenna device according to claim 6, wherein the second control circuit is configured to:
   detect a radiation signal intensity when each of the plurality of second conductive assemblies transmits the differential excitation current;
   determine a target second conductive assembly from the plurality of second conductive assemblies according to radiation signal intensities, the target second conductive assembly being a conductive assembly with the strongest radiation signal intensity from the plurality of second conductive assemblies; and
   control the second switch to allow the second differential signal port to be in communication with the target second conductive assembly.

8. The antenna device according to claim 6, wherein the second control circuit is configured to:
   detect a distance between each of the plurality of second conductive assemblies and an external object;
   determine a target second conductive assembly from the plurality of second conductive assemblies according to distances, the target second conductive assembly being a conductive assembly from the plurality of second conductive assemblies having the smallest distance from the external object; and
   control the second switch to allow the second differential signal port to be in communication with the target second conductive assembly.

9. The antenna device according to claim 1, further comprising:
   a first non-near-field communication chip configured to provide a first non-near-field communication excitation signal; and
   each of the plurality of first conductive assemblies further comprising a third feed port electrically coupled to the first non-near-field communication chip, and configured to transmit the first non-near-field communication excitation signal.

10. The antenna device according to claim 9, wherein in each of the plurality of first conductive assemblies, the third feed port and the first feed port are located at the same side of the first ground port, and a distance between the first feed port and the first ground port is greater than a distance between the third feed port and the first ground port.

11. The antenna device according to claim 10, wherein each of the plurality of first conductive assemblies comprises:
   a first resonating arm comprising a first end portion and a second end portion opposite to each other, the first ground port being arranged at the first end portion, and the third feed port being arranged at the second end portion; and
   a first feed path electrically coupled to the second end portion of the first resonating arm, the first feed port being arranged in the first feed path.

12. The antenna device according to claim 1, further comprising:
   a second non-near-field communication chip configured to provide a second non-near-field communication excitation signal; and
   the second conductive assembly further comprising a fourth feed port electrically coupled to the second non-near-field communication chip, and configured to transmit the second non-near-field communication excitation signal.

13. The antenna device according to claim 12, wherein the fourth feed port and the second feed port are located at the same side of the second ground port, and a distance between the second feed port and the second ground port is greater than a distance between the fourth feed port and the second ground port.

14. The antenna device according to claim 13, wherein the second conductive assembly comprises:
a second resonating arm comprising a third end portion and a fourth end portion opposite to each other, the second ground port being arranged at the third end portion, and the fourth feed port being arranged at the fourth end portion; and
a second feed path electrically coupled to the fourth end portion of the second resonating arm, the second feed port being arranged in the second feed path.

15. An electronic apparatus, comprising:
a circuit board; and
an antenna device comprising:
a near field communication chip arranged on the circuit board, and providing a differential excitation current through a first differential signal port and a second differential signal port;
a ground plane arranged on the circuit board, comprising a first ground point and a second ground point spaced apart from each other, wherein a conductive path is formed between the first ground point and the second ground point;
a plurality of first conductive assemblies, each of the plurality of first conductive assemblies comprising a first feed port and a first ground port spaced apart from each other, the first ground port being electrically coupled to the first ground point;
at least one switch comprising a first pole port coupled to the first differential signal port, and a first throw port coupled to the first feed port of each of the plurality of first conductive assemblies, the at least one switch configured to selectively allow the first differential signal port to be in communication with one or more first conductive assemblies from the plurality of first conductive assemblies; and
a second conductive assembly comprising a second feed port and a second ground port spaced apart from each other, the second feed port being electrically coupled to the second differential signal port, and the second ground port being electrically coupled to the second ground point;
wherein when the at least one switch allows the first differential signal port to be in communication with the first conductive assembly, the first conductive assembly, the conductive path, and the second conductive assembly jointly generate an alternating electromagnetic field to radiate an NFC signal.

16. The electronic apparatus according to claim 15, wherein the circuit board is provided with a printed circuit, and at least one conductive assembly of the plurality of first conductive assemblies or the second conductive assembly comprises the printed circuit.

17. The electronic apparatus according to claim 15, further comprising a flexible printed circuit electrically coupled to the circuit board, the flexible printed circuit being provided with metal traces, and at least one conductive assembly of the plurality of first conductive assemblies or the second conductive assembly comprising the metal traces.

18. The electronic apparatus according to claim 15, further comprising a middle frame, the circuit board being arranged at the middle frame, the middle frame comprising a first metal branch and a second metal branch spaced apart from each other, one of the plurality of first conductive assemblies comprising the first metal branch, and the second conductive assembly comprising the second metal branch.

19. A method for antenna switching, comprising:
providing an antenna device, the antenna device comprising:
a near field communication chip comprising a first differential signal port and a second differential signal port;
a ground plane comprising a first ground point and a second ground point spaced apart from each other;
a plurality of first conductive assemblies, each of the plurality of first conductive assemblies comprising a first feed port and a first ground port spaced apart from each other, the first ground port being electrically coupled to the first ground point;
a switch comprising a pole port coupled to the first differential signal port and a throw port coupled to the first feed port of each of the plurality of first conductive assemblies; and
a second conductive assembly comprising a second feed port and a second ground port spaced apart from each other, the second feed port being electrically coupled to the second differential signal port, and the second ground port being electrically coupled to the second ground point;
detecting a distance between each of the plurality of first conductive assemblies and an external object;
determining a target first conductive assembly from the plurality of first conductive assemblies according to distances, the target first conductive assembly from the plurality of first conductive assemblies being a conductive assembly having the smallest distance from the external object; and
controlling the switch to allow the first differential signal port to be in communication with the target first conductive assembly.

20. The method according to claim 19, wherein determining the target first conductive assembly from the plurality of first conductive assemblies according to distances comprises:
determining the conductive assembly from the plurality of first conductive assemblies having the smallest distance from the external object according to the distances;
detecting a holding position when a user holds the antenna device;
judging whether the conductive assembly having the smallest distance from the external object is located at the holding position; and
determining the conductive assembly as the target first conductive assembly if the conductive assembly is not located at the holding position.

* * * * *